June 26, 1951     H. V. SCHWEITZER     2,558,274
APPARATUS FOR DECORATING CERAMIC WARE AND THE LIKE
Filed April 27, 1946     12 Sheets-Sheet 1
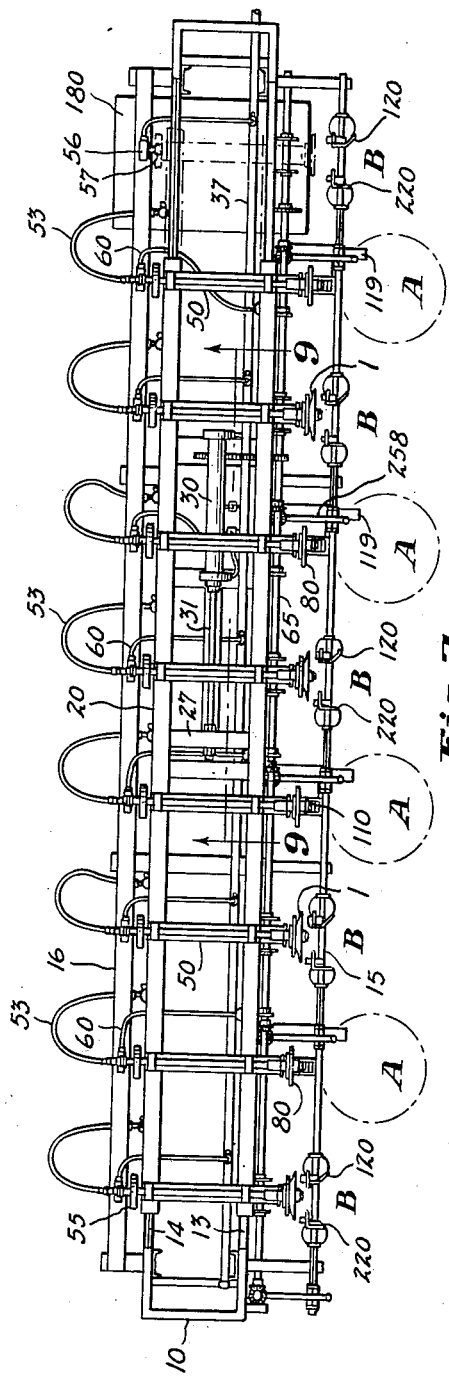
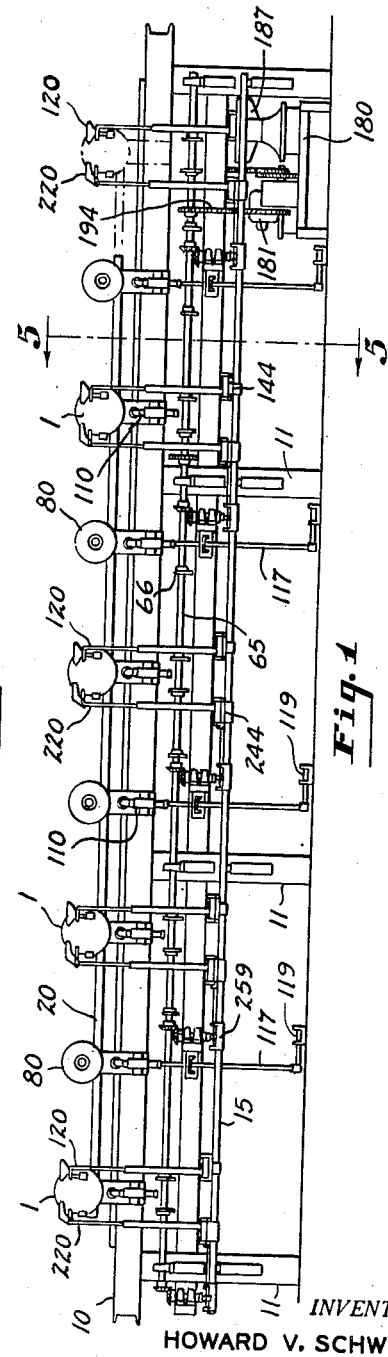
INVENTOR.
HOWARD V. SCHWEITZER
BY
Ely & Frye
ATTORNEYS

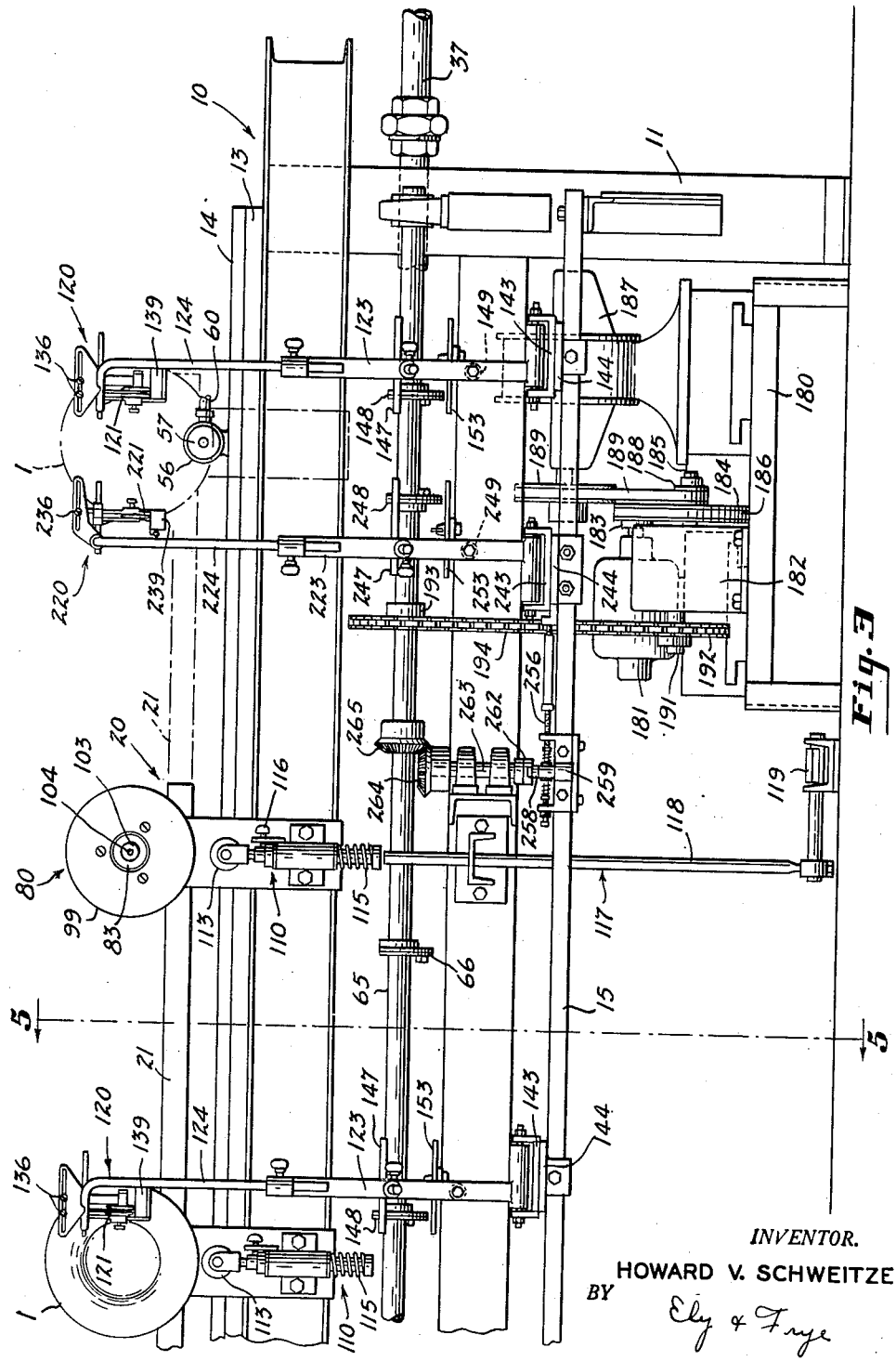

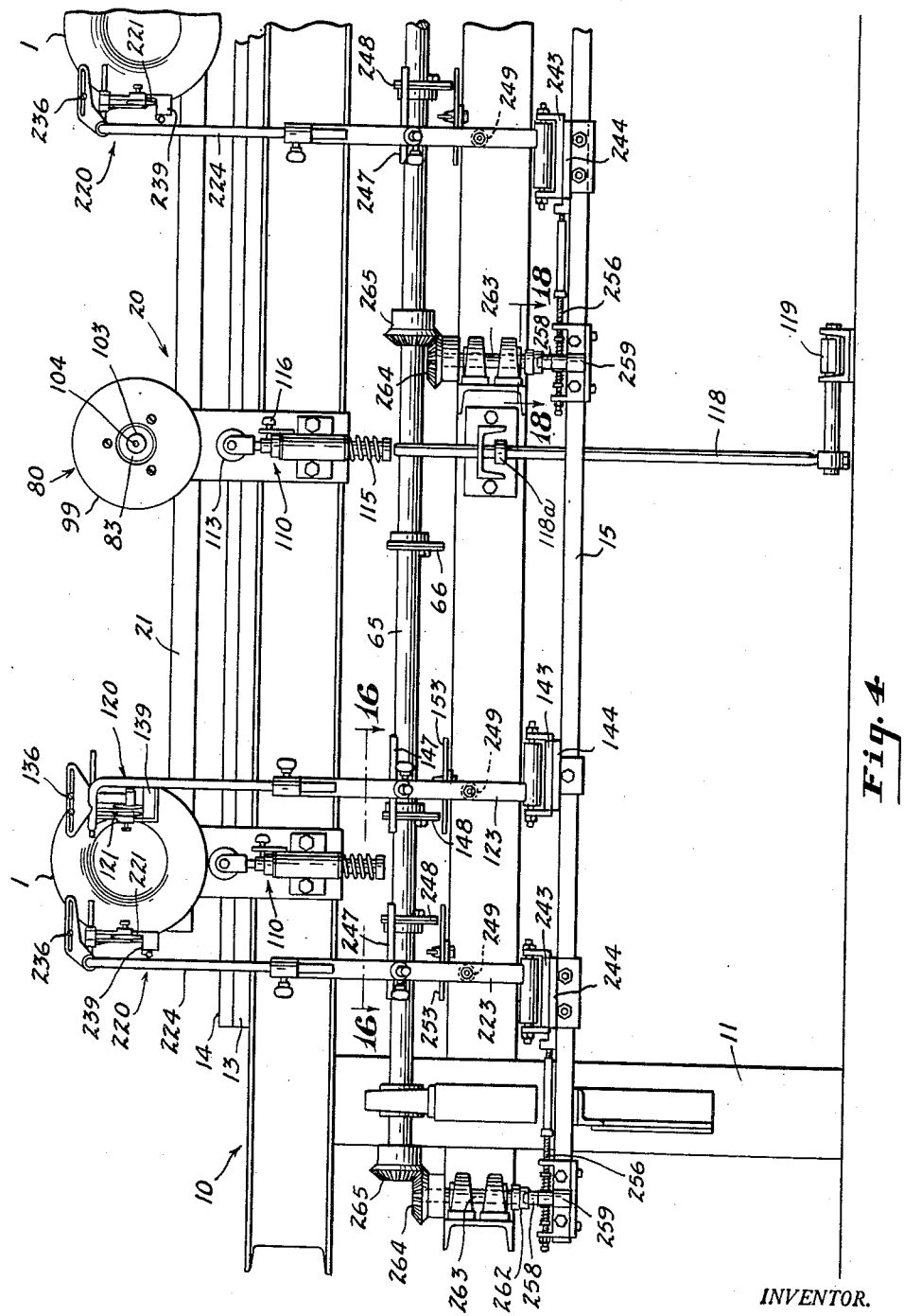

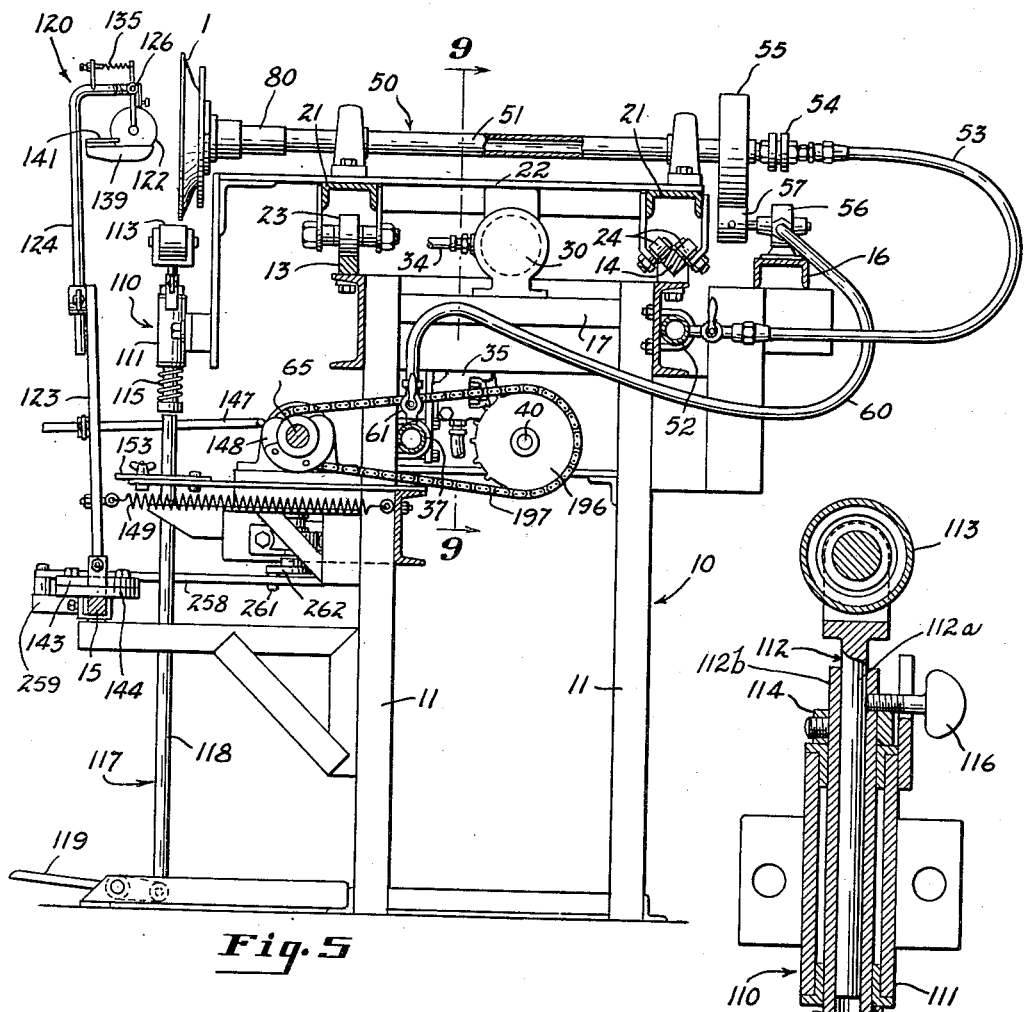
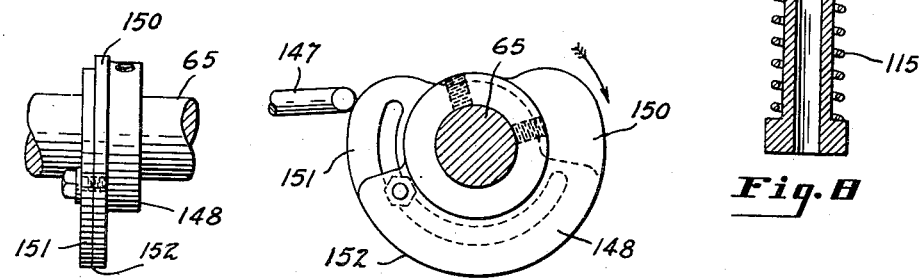

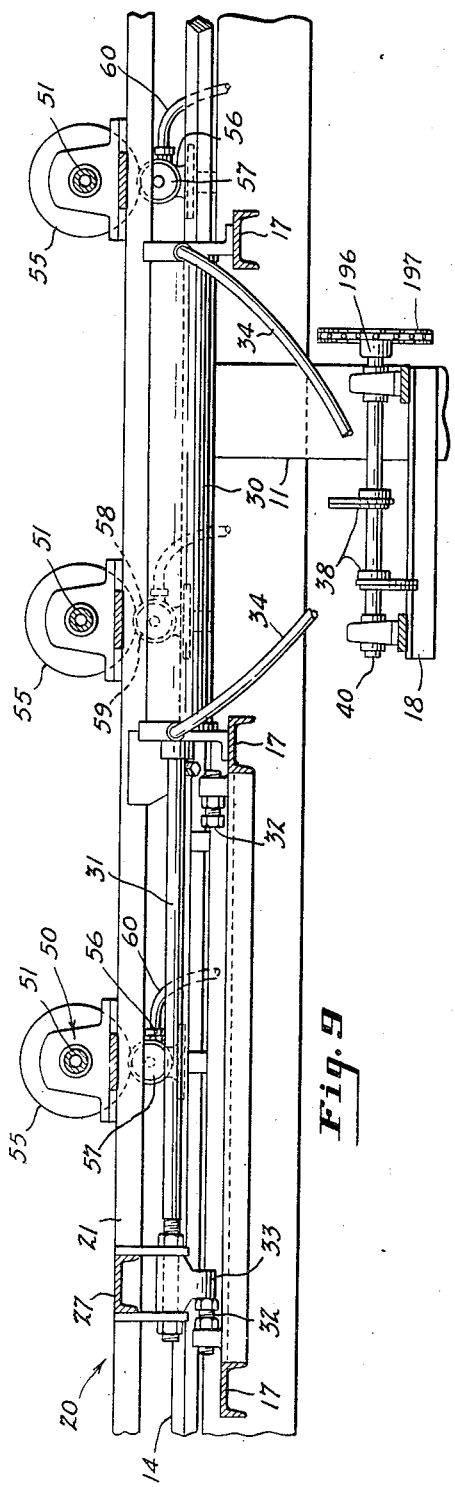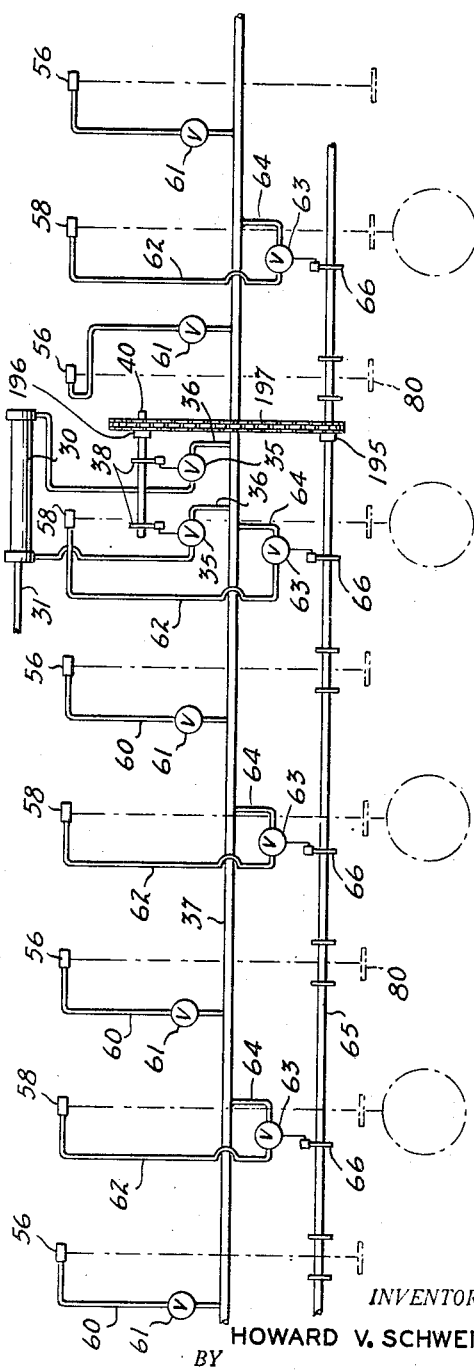

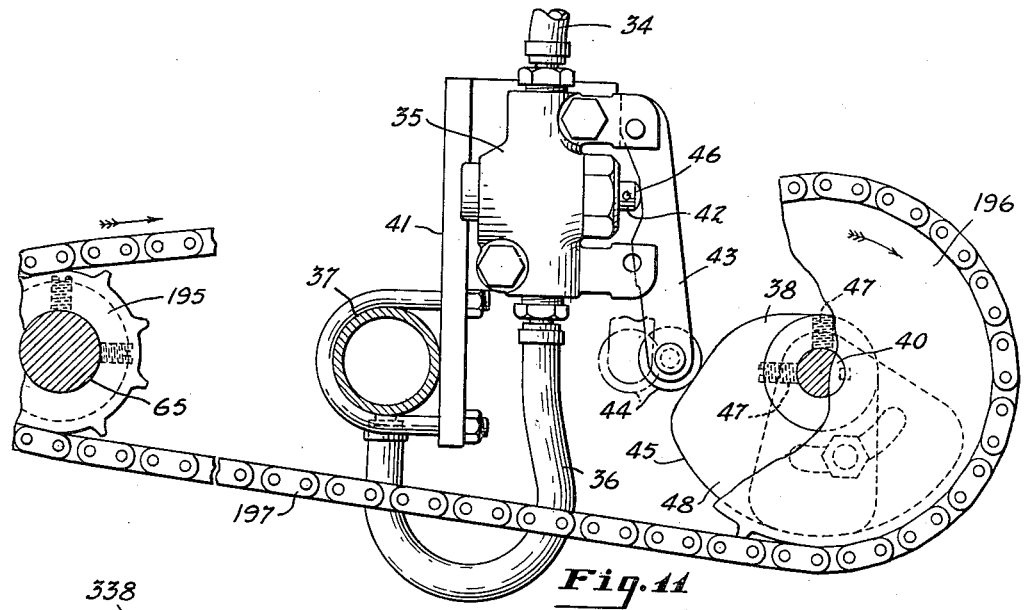

June 26, 1951   H. V. SCHWEITZER   2,558,274
APPARATUS FOR DECORATING CERAMIC WARE AND THE LIKE
Filed April 27, 1946   12 Sheets-Sheet 7

INVENTOR.
HOWARD V. SCHWEITZER
BY
Ely + Frye
ATTORNEYS

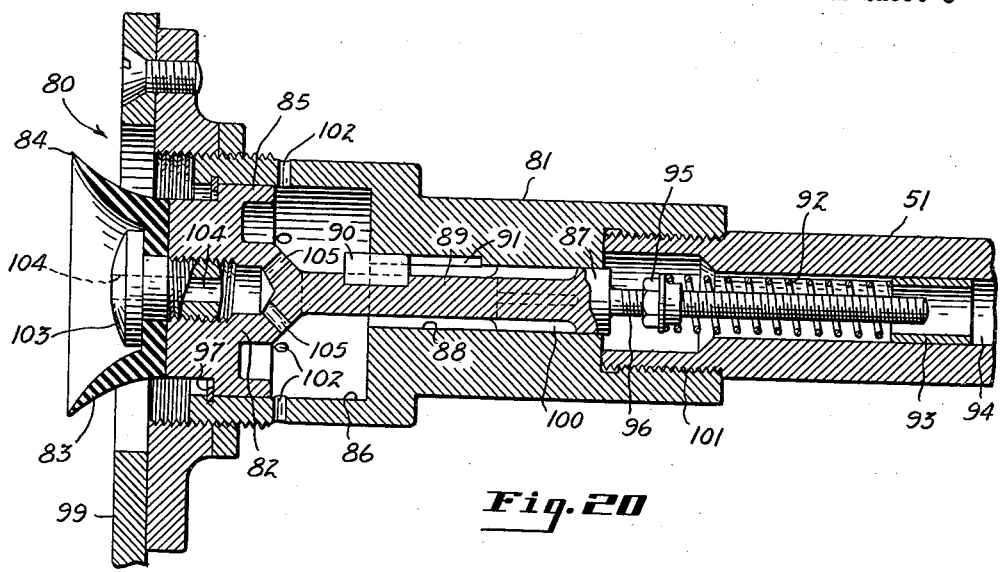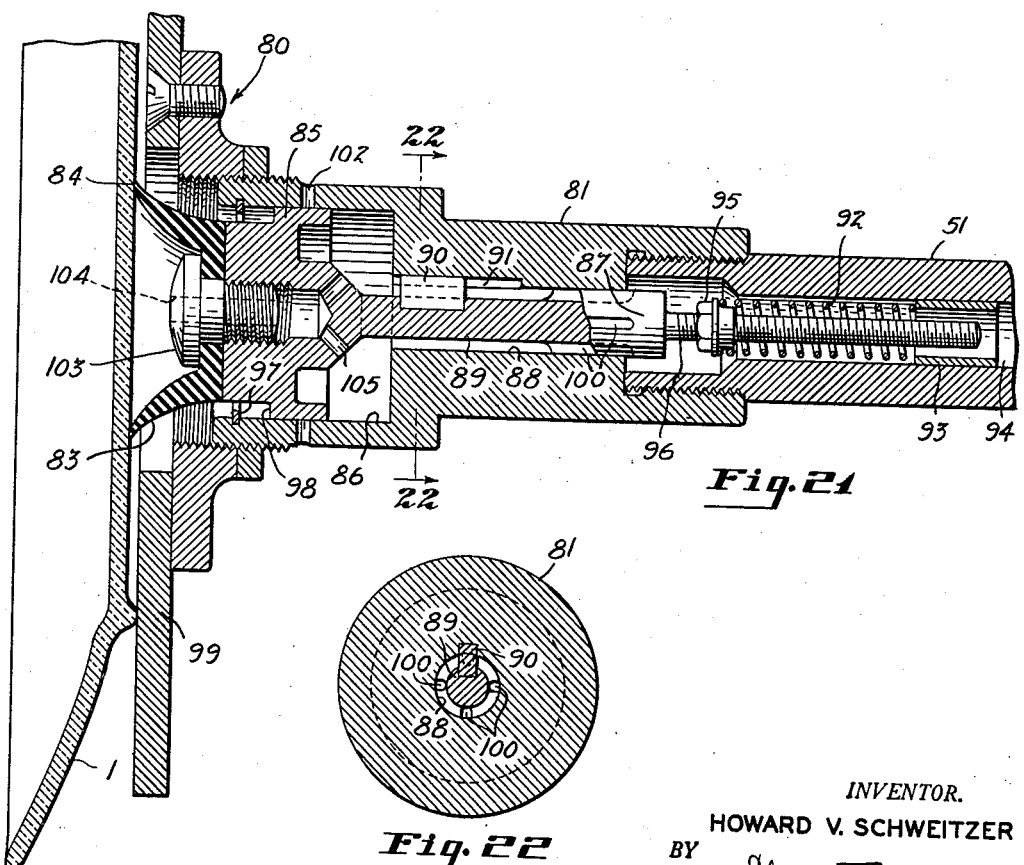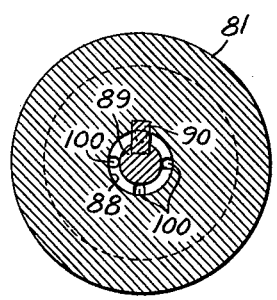

June 26, 1951 H. V. SCHWEITZER 2,558,274
APPARATUS FOR DECORATING CERAMIC WARE AND THE LIKE
Filed April 27, 1946 12 Sheets-Sheet 9
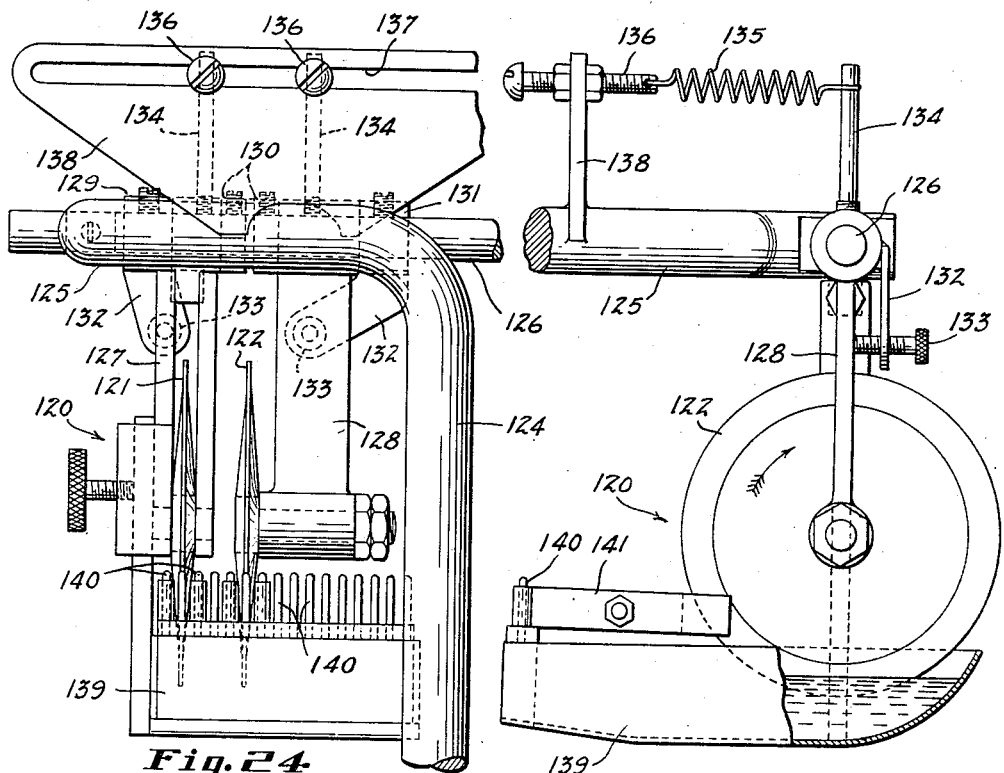
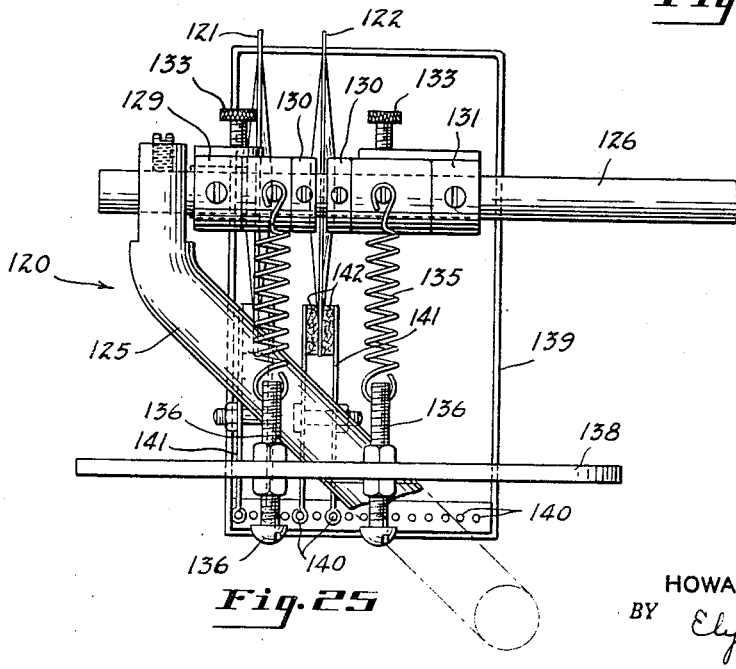
INVENTOR.
HOWARD V SCHWEITZER
BY Ely & Frye
ATTORNEYS

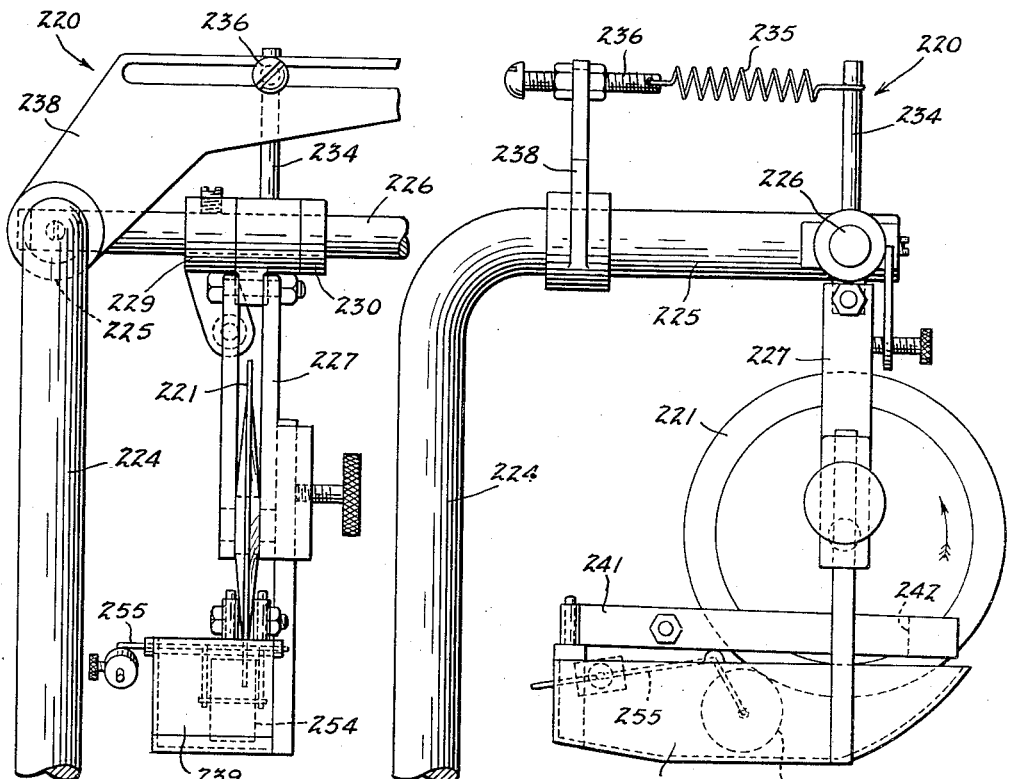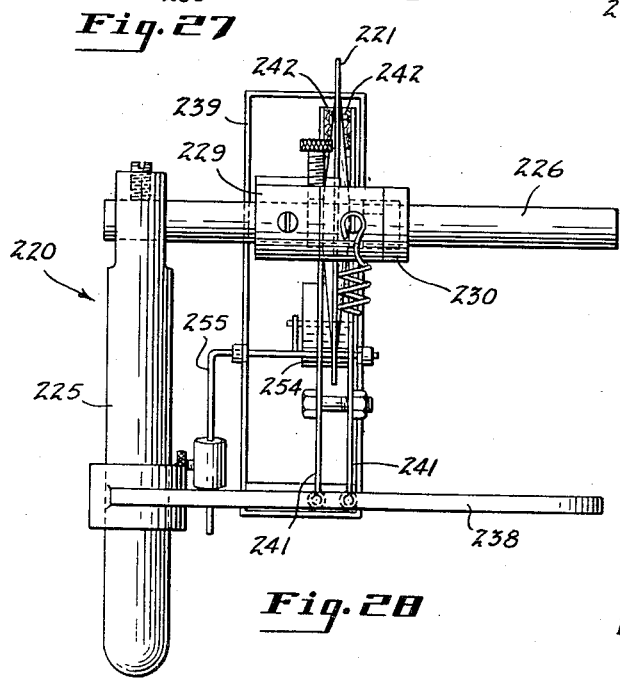

June 26, 1951      H. V. SCHWEITZER      2,558,274
APPARATUS FOR DECORATING CERAMIC WARE AND THE LIKE Filed April 27, 1946      12 Sheets-Sheet 11

INVENTOR.
HOWARD V. SCHWEITZER
BY
Ely & Frye
ATTORNEYS

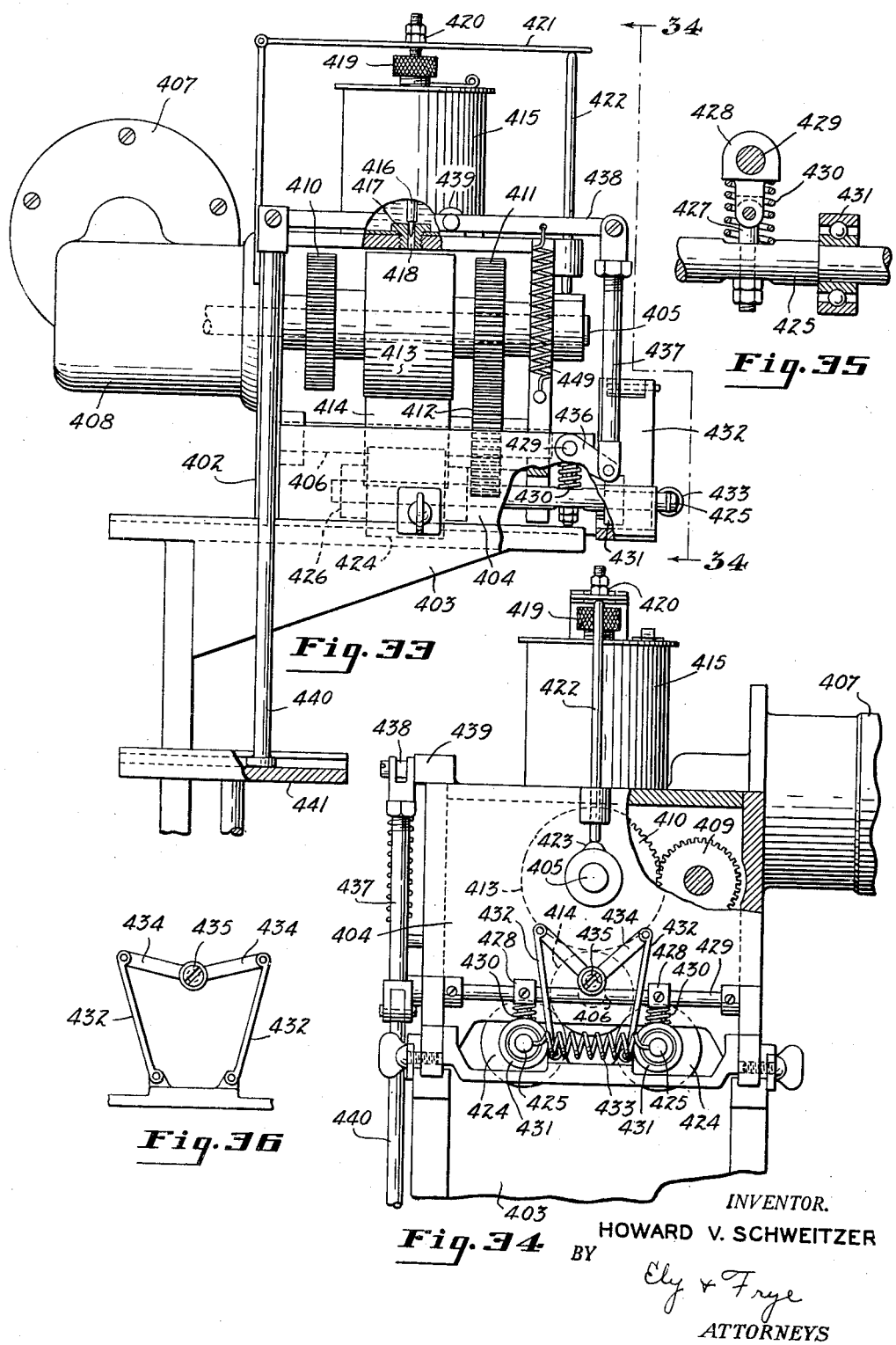

Patented June 26, 1951

2,558,274

UNITED STATES PATENT OFFICE 2,558,274

APPARATUS FOR DECORATING CERAMIC WARE AND THE LIKE

Howard V. Schweitzer, Shaker Heights, Ohio

Application April 27, 1946, Serial No. 665,354

26 Claims. (Cl. 91—12)

This invention relates to decorating apparatus, and more particularly to a machine for applying one or more concentric lines and/or bands to plates, saucers, or dish-like ware of ceramic or other materials. For the purposes of illustration the invention will be discussed in connection with the application to ceramic ware of lines or bands of decorative material, which hereinafter for convenience will be referred to as "lines" applied by a "lining" operation.

Lining machines have been successfully employed heretofore for applying co-axially spaced lines of paint on the outer convex surfaces of glass tumblers, buckets and like cylindrical or slightly conical articles. The application of bands on the edges of dish-ware and concentric lines on the generally convex rims of dish-ware are still performed almost entirely by hand. However, automatic or semi-automatic machines for performing such banding or lining operations on dish-ware have been proposed but have not yet been successful in actual production, for a number of reasons varying according to the type of machine. In general, such proposed machines for lining dish-ware have comprised a plurality of spindles mounted on a rotatable table for carrying the ware to successive stations for applying lines to the ware; the same power means being employed to drive the spindles and rotate the table. When built such proposed machines have been found to be deficient in many respects; if operative the rate of production has been low for the skilled manpower required to operate the machines and for the machinery cost and plant space involved. The basic design of such machines has prevented the operation of the machines with sufficient precision at increased, economical speeds to warrant their use instead of lining the ware by hand.

It is an object and advantage of this invention that fully automatic (except for loading and unloading) machines are now made available for applying concentric lines and edge bands to dish-ware. The machines made according to this invention require only unskilled operations for loading and unloading and produce better lining at lower cost and at vastly higher rates of production than have been obtained heretofore by mechanical or manual lining.

It is an additional object of this invention to provide a lining apparatus in which the rotatable spindles carrying the ware to be lined are individually driven at the loading and applicator stations, and the prime-mover supplying the power for indexing the spindles between the loading and applicator stations is separate from the source of power for timing the operation of the machine. Thus, the heavy loads encountered in the high speed operation of the machine do not interfere with the split-second control of the operation of the machine. Machines made according to this invention are rugged and yet easily adjusted for precise operation. The machine is flexible in operation and may line several different sizes of ware simultaneously.

It is a further object of this invention to provide a lining apparatus comprising a supporting frame having adjacent loading and applicator stations, and a carriage supporting a rotatable spindle adapted to carry the ware to be lined, which carriage moves back and forth on the frame to move the ware-carrying spindle from the loading station at which the ware is mounted on the spindle, to the applicator station at which the ware is lined, and then back to the same loading station at which the ware is removed and at which the spindle again has mounted thereon other ware.

It is a further object of the invention to provide a lining apparatus comprising a plurality of alternately disposed loading and applicator stations; a carriage supporting a plurality of spindles adapted to carry ware; and means for so reciprocating the carriage in such timed relation that alternate spindles are first positioned at the loading stations for a time sufficient to permit lined ware carried by said spindles to be removed therefrom and ware to be lined to be mounted thereon while the remaining spindles carrying ware are positioned at the applicator stations at which said ware is lined, after which the spindles carrying ware to be lined are moved from the loading stations to the applicator stations where the ware is lined while the remaining spindles are moved to the loading stations and there positioned for a time sufficient to permit the lined ware carried by said spindles to be removed therefrom and ware to be lined to be mounted on said spindles, after which the spindles are moved back to their original positions and the cycle is repeated.

It is a further object of this invention to provide a machine of this type in which the loading stations and applicator stations are preferably arranged along one side of a longitudinally extending machine, thus allowing the machine to be employed in plants designed for a straight-line movement of products through the plant and permitting economical utilization of floor space.

It is an additional object of this invention to provide at each applicator station means for lining the ware comprising at least one lining wheel adapted to be brought into and taken out of rolling contact with the ware by means operating in timed relation with the means for moving the spindles carrying the ware into and out of the applicator stations.

It is a further object of this invention to provide lining means comprising a lining wheel which is moved substantially radially of the axis of rotation of the ware being lined, to provide a wide line adjustable to a desired width, by mechanical means operating in timed relation with the means for moving the spindles carrying the ware into and out of the applicator stations.

It is a further object of this invention to provide a novel and advantageous vacuum chuck for holding the ceramic ware on the spindles.

It is a further object of this invention to provide a novel and advantageous mechanism for applying a band of decorative material to the edge of the ware.

These and further advantages, features and objects of the invention will be apparent from the following description of a preferred embodiment of the invention in conjunction with the accompanying drawings and from the appended claims. In the drawings:

Fig. 1 is a front elevation of a preferred embodiment of the invention, to a greatly reduced scale;

Fig. 2 is a plan elevation of the apparatus in Fig. 1;

Fig. 3 is a front elevation of a portion of the apparatus of Figs. 1 and 2 corresponding to the righthand end portion of Fig. 1 but to a larger scale;

Fig. 4 is a front elevation of a portion of the apparatus of Figs. 1 and 2 corresponding to the lefthand end portion of Fig. 1, but to a larger scale;

Figure 16:
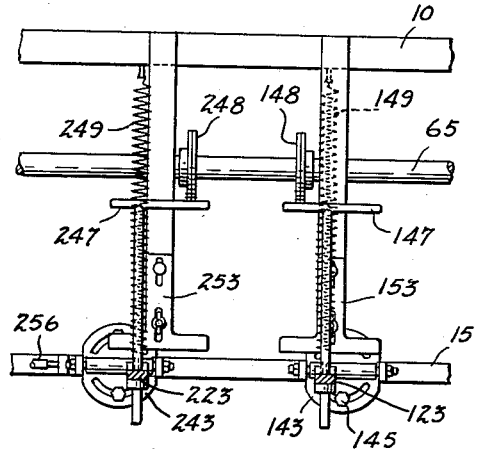
Figure 17:
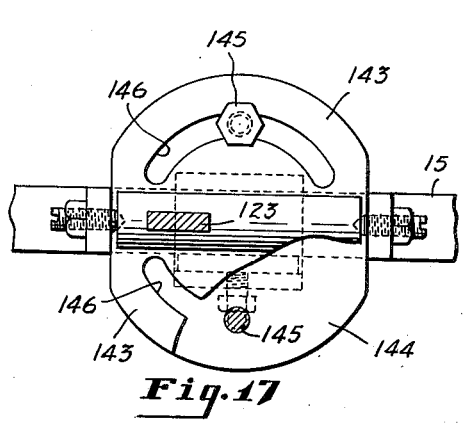
Figure 15:
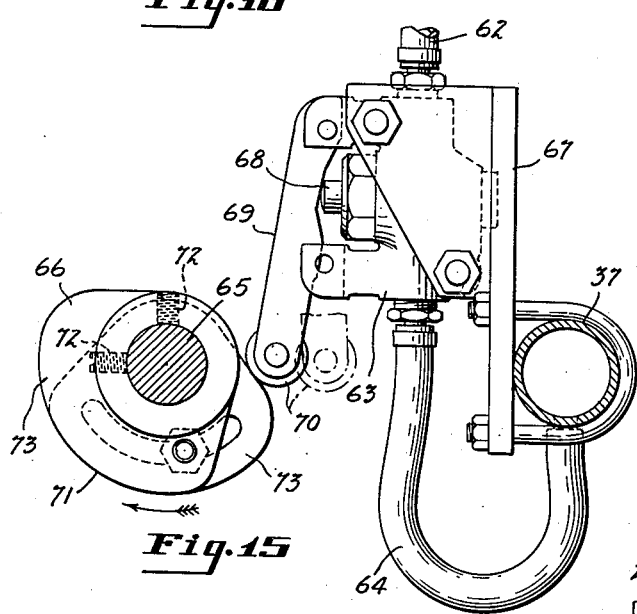
Figure 18:
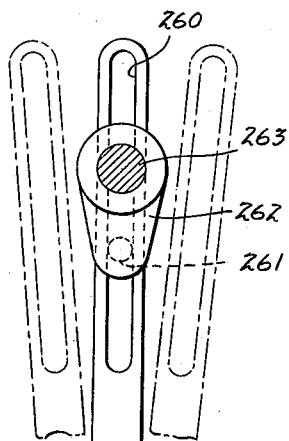
Figure 19:
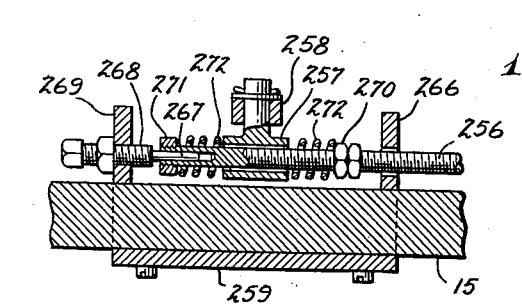
Figure 29:
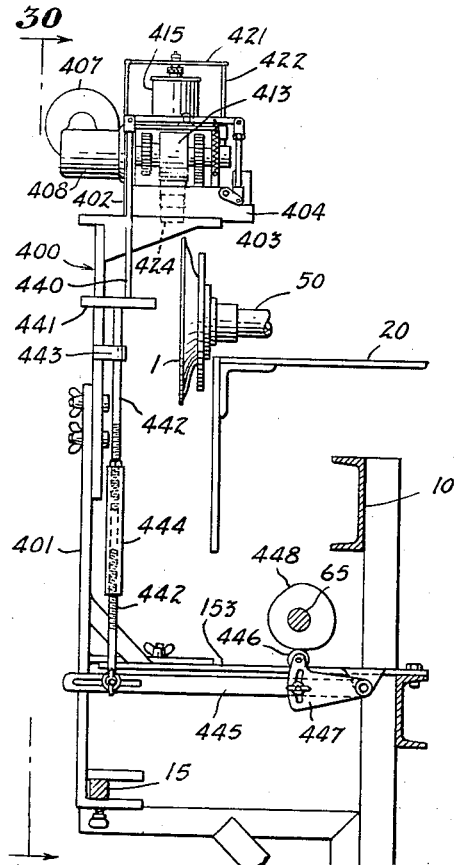
Figure 30:
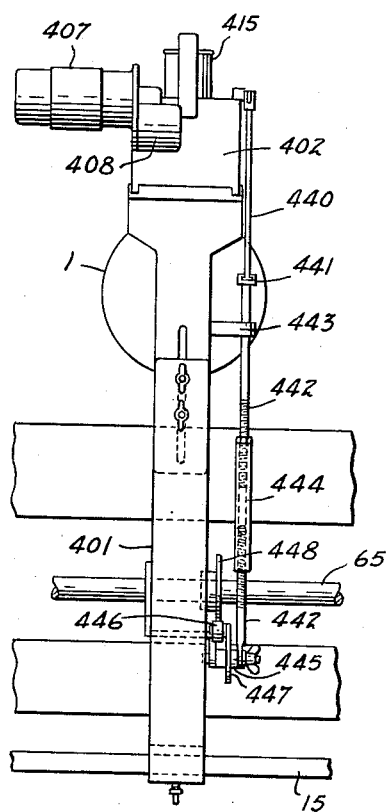
Figure 31:
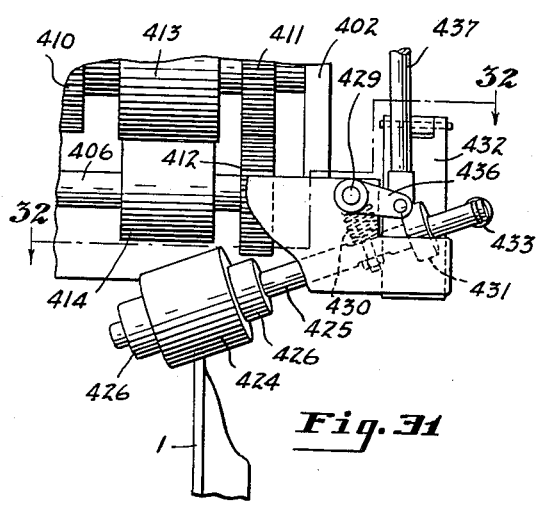
Figure 32:
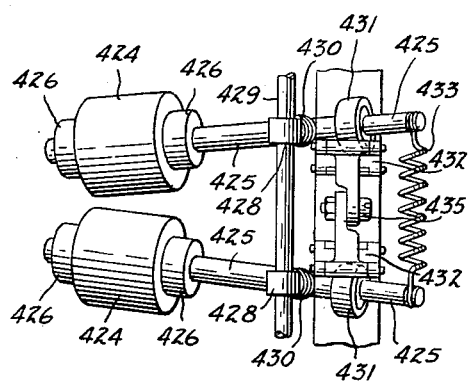

Fig. 5 is a sectional elevation, to the same scale as that of Figs. 3 and 4, from line 5—5 in each of Figs. 1 and 3;

Fig. 6 is a side elevation, to a scale larger than that of Figs. 3–5, of a cam for causing lining means to move toward and away from the ware to be lined;

Fig. 7 is an end elevation of said cam;

Fig. 8 is a sectional elevation, to a scale larger than that of Figs. 3–5, of a portion of the means for centering the ware mounted on a spindle;

Fig. 9 is a sectional elevation, along line 9—9 of Fig. 2 and line 9—9 of Fig. 5, showing the carriage-actuating cylinder and spindle rotating means, this figure being to the same scale as that of Figs. 3–5;

Fig. 10 is a diagrammatic representation of the compressed air system and controls therefor;

Fig. 11 is a sectional elevation, consisting of an enlarged representation of a portion of Fig. 5, showing the means for driving the secondary time shaft from the primary time shaft, a cam on said secondary time shaft and a control valve operated by the cam for controlling the air cylinder actuating the carriage, parts being broken away to show the construction more clearly and a scale substantially larger than that of Fig. 5 being employed;

Fig. 12 is a side elevation of a portion of a modified lining means which may be employed in the apparatus of the previous figures, this elevation being to a scale larger than that of Figs. 3–5;

Fig. 12 is an end elevation of the apparatus of Fig. 12;

Fig. 14 is a sectional elevation along line 14—14 of Fig. 12 showing the construction of the adjustable wiping means;

Fig. 15 is an elevation, to the same scale as that of Fig. 11, of a cam mounted on the primary time shaft and associated air valve for controlling a spindle-driving air motor at a loading station;

Fig. 16 is a sectional elevation, along line 16—16 of Fig. 4 and to the same scale, showing the mounting of the lining means and the controlling cams therefor;

Fig. 17 is an enlarged detail elevation showing the construction of the base on which one of the lining means is pivotally mounted;

Fig. 18 is a detail sectional plan elevation, along line 18—18 of Fig. 4 and to a larger scale, of one of the means for reciprocating a lining means longitudinally of the apparatus;

Fig. 19 is a detail sectional elevation along line 19—19 of Fig. 18;

Fig. 20 is a sectional elevation, to a scale larger than that of Figs. 3–5 showing one form of means for holding ware on a spindle, the parts in this elevation being shown in the position they occupy when the device has no ware mounted thereon;

Fig. 21 is a sectional elevation of the device of Fig. 20, with the parts in the positions they occupy when the device has ware mounted thereon;

Fig. 22 is a sectional elevation along line 22—22 of Fig. 21;

Fig. 23 is a side elevation, to the same scale as that of Figs. 12–14, of the upper portion of one of the lining means shown as employed in the apparatus of Figs. 1–11 and 15–28;

Fig. 24 is an end elevation of the apparatus of Fig. 23;

Fig. 25 is a plan elevation of the apparatus of Fig. 23;

Fig. 26 is a side elevation of the upper portion of the other lining means shown as employed in Figs. 1–11 and 15–28;

Fig. 27 is an end elevation of the device of Fig. 26;

Fig. 28 is a plan elevation of the device of Fig. 26;

Fig. 29 is a side elevation of a device for applying a band to the edge of ware, which may be employed in the apparatus of Figs. 1–11 and 15–28, this figure being to the same scale and generally along the same section as that of Fig. 5;

Fig. 30 is a rear elevation of the portion of the apparatus embodying the device of Fig. 29, from line 30—30 of Fig. 29;

Fig. 31 is a detail elevation of a portion of the apparatus of Figs. 29 and 30 showing one of the applicator rolls in position to band the edge of the ware, the scale of this figure being larger than that of Figs. 29 and 30;

Fig. 32 is a detail plan elevation showing the two applicator rolls of the device of Figs. 29 and 30 in ware-contacting position, the scale of this figure being the same as that of Fig. 31;

Fig. 33 is an enlarged side elevation, corresponding to the upper portion of Fig. 29;

Fig. 34 is a front elevation of the device of Fig. 33, taken from line 34—34 of Fig. 33;

Fig. 35 is a detail elevation showing the connection for one of the applicator roll shafts to a supporting member; and Fig. 36 is a detail elevation showing a construction of the adjustable cam for controlling the amount of cant of the applicator rolls.

In the drawings, like reference numerals refer to like parts throughout.

The apparatus shown in the drawings comprises rigid frame 10 slidably supporting a carriage 20 which has mounted thereon a plurality of spaced, rotatable ware-carrying spindles 50. Spaced along the front of operating face of the machine as shown in Fig. 2 are a plurality of loading stations A at which operators work and, alternately disposed therewith, a plurality of applicator stations B at each of which ware 1 carried by a spindle 50 is decorated by lining means indicated generally by 120 and 220 in Figs. 1 and 2. The illustrated apparatus comprises four loading stations A, five applicator stations B, and eight spindles 20. In the drawings, the spindle 50 at each applicator station A is shown as carrying ceramic ware taking the form of a plate 1, whereas each spindle 50 at a loading station is shown as carrying no ware, being ready to have ware mounted thereon.

Means hereinafter described are embodied in the apparatus for reciprocating the carriage 20 in such manner that at predetermined intervals each spindle carried by the carriage is positioned at a loading station for a time long enough to permit lined ware to be removed therefrom and ware to be lined to be mounted thereon by an operator at the loading station. The spindle, with the ware so mounted, is then moved to an adjacent applicator station at which the ware is lined by the lining means 120 and 220. The ware-carrying spindle is then moved back to the original loading station where the operator can remove the lined ware and mount unlined ware, the cycle being repeated continuously. While alternate spindles are at loading stations being unloaded and loaded during a cycle, the remaining spindles are at the applicator stations where ware carried by such spindles is lined; each operator at a loading station at successive intervals removes lined ware from and mounts unlined ware on each of two adjacent spindles. In the illustrated straight-line apparatus, at each applicator station, except those at the ends of the illustrated apparatus, the ware lined is that which is mounted on two adjacent spindles by adjacent operators; while at the applicator station at each end of the apparatus the ware lined is that which is mounted only on the spindle at that end of the apparatus by the operator nearest that end of the apparatus. Due to the alternate operation, ware carried by each spindle is loaded and unloaded at but one loading station and lined at but one lining station, though each loading station alternately serves two adjacent spindles. As a consequence of this operation, a number of different sizes of ware and different styles of lining may be simultaneously lined on the machine. The number of different sizes of ware and different styles of lining is limited only by the number of applicator stations, five in the illustrated embodiment, though obviously not more than two styles of lining can be handled at a given loading station. The manner in which the flexible operation is accomplished may be explained by reference to Figs. 1 and 2 of the drawings. Starting at the right-hand end of the apparatus for example, the end applicator station may be set for lining a different diameter of ware than the next applicator station. The operator at the loading station between the end and the adjacent lining stations simply alternately loads the two different sizes of ware, one size for the end applicator station and the other size for the other applicator station served by that loading station. Similar alternate loading may be carried on at the other loading stations, if desired.

It will be observed that the production of the end applicator station is only half of those located between loading stations, in the straight-line embodiment disclosed. This is not a disadvantage, as might be supposed. In lined dishware, which is almost always open stock ware, there is a much greater demand for certain sizes of ware than for others; for example, there is likely to be a greater demand for eight-inch plates than for ten-inch plates or for cup saucers. By setting up the end stations for less popular sizes, the less popular sizes may be handled without interrupting production on the more popular sizes. Obviously, the ability of different applicator stations to handle different styles of lining as well as different sizes of ware further increases the flexibility of the machine and its adaptability to the production demands of the pottery in which it is employed.

Construction of frame

The frame 10 is generally longitudinal in shape and of rigid construction; it comprises spaced vertical members 11 having fixed to their upper ends spaced longitudinal members 12; these members carry ways 13 and 14 on which the carriage 20 travels. Way 13 is shown as having a flat upper surface while way 14 is shown as having two angularly disposed upper surfaces to provide lateral guidance for the carriage. Frame 10 also comprises a longitudinal lower member 15 fixed to the front members 11 and adapted to support parts of the applicator means and a longitudinal member 16 supported by suitable brackets from the rear members 11 and adapted to support means hereinafter described for rotating the spindles 50.

Construction of carriage

The reciprocable carriage 20 comprises spaced longitudinally extending members 21 which are rigidly connected together by cross members 22 as shown in Figs. 2 and 5. The carriage is mounted for movement longitudinally of the frame 10, on a plurality of rollers 23 and 24; the rollers 23 are rotatably mounted on and beneath the member 21 of the carriage nearest the operating side of the apparatus for travel on the flat surface of way 13; the rollers 24, in angularly disposed pairs, are rotatably mounted on and beneath the member 21 of the carriage nearest the rear of the apparatus and bear against the angularly disposed upper surfaces of the way 14, thus guiding the carriage and preventing transverse movement thereof.

The carriage 20 has rotatably mounted thereon the plurality of equally and suitably spaced rotatable spindles 50 which extend transversely of the carriage. Each of said spindles is provided at the end thereof nearest the operating side of the apparatus with chucks 80 for holding the ware to be lined, which chucks are preferably of the construction hereinafter described, and at the other end with hereinafter described means for rotating the spindle.

Carriage reciprocating means

In the illustrated apparatus, as shown to advantage in Figs. 2, 5, 9, 10 and 11, the means for reciprocating the carriage 20 and its spindles 50 longitudinally of the apparatus comprises an air cylinder 30 fixed to suitable cross members 17 of the frame 10. A piston rod 31, one end of which is fixed to a piston in the cylinder, has its other end connected to a cross member 27 of the carriage. The length of travel of the carriage is such that each spindle 50 is moved from a loading station to an adjacent applicator station and back to the original loading station, the spindles 50 on the carriage also being spaced by this distance. In the illustrated apparatus as shown in Fig. 9, adjustable stop members 32 on the frame 10 of the apparatus, and the cooperating stop member 33 on the carriage 20 accurately limit the travel of the carriage. However, instead of employing the stops 32 and 33 the travel of the carriage 20 may be limited and adjusted by employing a cylinder having the well-known and suitable means for limiting the travel of the piston therein.

As shown in Figs. 10 and 11, a tube 34 connects each end of the interior of cylinder 30 to the outlet of an individual valve 35, the inlet of which is connected by a tube 36 to an air pipe 37. As shown in Fig. 5, the pipe 37 is mounted on the rear of the front vertical members 11 of the frame and extends longitudinally of the apparatus, being connected to a suitable source of compressed air (not shown). The two valves 35 are mounted relatively closely together on the pipe 37 at suitable points intermediate the ends of the machine.

Each of the two valves 35 is opened and closed at the proper times by an individual cam 38 rigidly mounted on a rotatable secondary time shaft 40. As shown in Figs. 5, 9 and 10, said shaft 40 is rotatably mounted on a suitable sub-frame 18 forming part of frame 10 and located between two intermediate vertical members 11 thereof; said shaft 40 is rotated by means hereinafter described.

One of the air cylinder control valves 35, which may be employed in the apparatus of the invention, and its associated control cam 38, is shown in Fig. 11. In this figure, the valve 35 is mounted on a bracket 41 clamped to air pipe 37. The valve is provided with a plunger rod 42 adapted to be pushed into the valve by a cam-follower lever 43. The lever 43 is pivotally connected at one end to the valve 35 and carries at the other end thereof a rotatable roller 44 adapted to contact the surface 45 of the cam 38. The illustrated valve is a standard, commercial plunger-type three-way valve, which is opened by moving plunger rod 42 into the valve against the pressure of a spring in the valve and which is closed when the plunger rod is located in its outward position. As shown in Fig. 11, the plunger rod 42 is pushed part way into the valve, and hence the valve is partly open. The valve is so constructed that when it is closed and its plunger rod 42 is in its outward position, air from the outlet side of the valve bleeds through the plunger rod of ports 46 and gradually reduces to atmospheric the air pressure in the system connected to the outlet side of the valve.

Each cam 38 is adjustably mounted on the secondary time shaft 40 by set screw 47 and includes two relatively adjustable cam plates 48 to permit the length of the cam surface 45 to be adjusted.

*Operation of carriage*

The carriage is operated as follows during operation of the apparatus as a whole, reference being made to Figs. 1, 2, 3, 4, 9, 10 and 11. The secondary time shaft 40 having mounted thereon the two cams 38 which actuate the two valves 35 controlling the air cylinder 30, is constantly rotated at a suitable speed. Assuming the carriage 20 to be in one of its end positions, as it will normally be when not moving from one end position to the other, the valve 35 controlling the end of the air cylinder 30 at which the piston is located is opened by pressure of its cam follower lever 43 against the plunger rod 42 of the valve, said cam-follower lever 43 being moved by its associated cam 38. Air passes from compressed air pipe 37 through tube 36, said open valve 35, and its associated tube 34 to the cylinder 30, and drives the piston in the cylinder to the other end of the cylinder, thus moving the carriage 20 to its other extreme position. The surface 45 of cam 38 preferably is so shaped that said valve 35 is closed approximately when or before the carriage 20 reaches its other extreme position. The air pressure in the cylinder 30 operating on the piston therein, as well as the friction of the parts, holds the carriage in its extreme position; the air pressure in the cylinder is reduced to atmospheric as air bleeds from the closed valve 35.

The carriage 20 is kept at this extreme position for an interval determined by the time during which the shaft 40 rotates before the cam surface 45 of the other cam 38 engages its cam-follower lever 43 to force the plunger rod 42 of the other valve 35 into the valve to open it. Opening of the other valve 35 causes air from the compressed air pipe 37 to flow through tube 36, valve 35, and its associated tube 34 to the end of cylinder 30 at which the piston is disposed, thus moving the piston to the end of the cylinder at which it was originally disposed and moving the carriage to the extreme position at which it was originally disposed; said valve 35 is likewise closed when or before the carriage reaches the original position, where the carriage is similarly held by the gradually bled air pressure on the piston and by friction of the parts. After a suitable interval, the cycle is repeated. Since the cam surfaces 45 of the two cams 38 are of identical length and since they are 180° apart on the shaft 40, the carriage is kept at both of its extreme positions for the same period of time. This period, of course, can be varied as desired by varying the length of the cam surfaces 45; as indicated above the cams 38 are adjustable for this purpose.

*Construction of spindle and spindle drive*

In the illustrated embodiment, as shown in Figs. 1, 5, and 9, each spindle 50 comprises a hollow shaft 51, which is journalled in bearings mounted on carriage 20 and is restrained against axial movement.

Shaft 51 carries on its front end adjacent the operating side of the machine the chuck 80 for holding the ware to be lined and has connected to its rear end a flexible tube 53 connected to a pipe 52 mounted on the frame 10. A sub-atmospheric pressure is maintained in said pipe by means to be hereinafter described. A suitable fixture 54 is provided for connecting the non-rotating tube 52 to the rotatable shaft 51. Rigidly mounted on the shaft 51 adjacent its rear end is a wheel 55 having a suitable friction surface.

Mounted on the longitudinal member 16 at the rear of frame 10 and opposite each applicator station are the air-driven motors 56, each carrying on its shaft a driving wheel 57. Opposite the loading stations are similar air-driven motors 58, each carrying on its shaft a driving wheel 59. Since each wheel 55 of each spindle shaft 51 alternately frictionally engages and is driven by the wheels 57 and 59, the engaging surfaces of wheels 55 and wheels 57 and 59 should be of such materials or of such configurations as will provide good frictional driving contact. Thus, one or both surfaces of wheels adapted to frictionally engage may be knurled or grooved. Advantageously the surface of one engageable wheel is formed of metal and the surface of the wheel adapted to engage it is formed of resin-impregnated textile fabric, leather, or the like.

As shown in Figs. 5, 9 and 10, the air inlet port 75 of each of the air-driven motors 56 opposite an applicator station is connected by flexible tube 60 to a valve 61 threaded into air pipe 37. In normal operation of the apparatus, valves 61 are open and all motors 56 operate continuously.

As shown in Figs. 9, 10, and 15, the air inlet port of each of the air-driven motors 58 opposite a loading station is connected by flexible tube 62 to a cam-operated valve 63, which is connected by a tube 64 to the air pipe 37. A primary time shaft 65, which extends the length of the apparatus, has rigidly mounted thereon a plurality of cams 66, which act to open and close all of valves 63 in unison. Shaft 65 is shown as rotatably mounted on brackets on the side of frame member 10 nearest the operating face of the apparatus, and is rotated by means to be hereinafter described.

Fig. 15 shows one of the air-motor control valves 63 which may be employed in the apparatus of the invention, and its associated control cam 66. The valve 63 is mounted on a bracket 67 clamped to air pipe 37. The valve includes a plunger rod 68 adapted to be pushed into the valve by a cam-follower lever 69; this lever is pivotally connected at one end to valve 63 and carries on its other end a rotatable roller 70 adapted to contact the surface 71 of the cam 66. The illustrated valve is a standard commercial plunger-type two-way valve, which is opened by moving plunger rod 68 into the valve against the pressure of a spring in the valve, and which is closed when the plunger rod is located in its outermost position shown in Fig. 15.

Each cam 66 is adjustably mounted on primary time shaft 65 by set screws 72, and includes two relatively adjustable cam plates 73 to permit the length of cam surface 71 to be adjusted as desired.

Operation of spindle

During operation of the apparatus, the primary time shaft 65 continuously rotates at a constant rate of speed, while the carriage 20 carrying the spindles 50 intermittently moves back and forth in such manner that each spindle 50 is moved from an applicator station to a loading station and back to the same applicator station, being positioned at each station for the same predetermined time interval.

When each spindle 50 arrives at an applicator station its wheel 55 frictionally engages the rotating driving wheel 57 of the continuously operating air-driven motor 56 opposite said applicator station, and hence the spindle rotates during the time it is at an applicator station. After the spindle leaves the applicator station and its wheel 55 no longer contacts said driving wheel 57, rotation of the spindle ceases. The spindle is stationary when it reaches the loading station, and remains so during the initial part of the time it is at the loading station; although the spindle wheel 55 engages the driving wheel 59 of the air-driven motor 58 opposite said loading station, said motor is not operating at this time. The spindle is not rotated during this initial period at the loading station in order to permit the operator to remove lined ware from the spindle and to mount on the spindle ware to be lined. Thereafter said air-driven motor 58 is started, which causes its driving wheel 59 by frictional engagement with wheel 55 of the spindle to rotate the spindle. Such spindle rotation is continued during all or most of the remainder of the time the spindle remains at the loading station, to permit the operator to center the ware on the spindle 50 by the aligning means hereinafter described. Thereafter the rotation of motor 58 is halted.

The cam 66 controlling the valve 63 for each motor 58 opposite a loading station is so mounted on the primary shaft 65 and has a length of cam surface 71 such that the cam-follower lever 69 opens and closes the valve 63 at the proper intervals as the shaft 65 rotates, thus starting and stopping the motor 58 at the proper intervals. In the illustrated embodiment, all cams 66 for the respective motors 58 have the same shape and are mounted in the same positions relative to the shaft 65, so that all motors 58 are started and stopped simultaneously. Moreover, the direction of rotation of the driving wheels 59 on all motors 58 is the same as the direction of rotation of the driving wheels 57 of the motors 56.

Construction of ware-holding means on spindles

While various means may be employed for holding ware on each of the spindles 50, that shown in the illustrated embodiment and in detail in Figs. 20, 21 and 22 is particularly advantageous. The device of these figures is a vacuum-operated chuck 80, Fig. 20 showing the arrangement of the parts when it has no ware mounted thereon, and Fig. 21 showing the arrangement of the parts of the chuck when ware 1 is mounted thereon.

In the device of these figures, the end of the spindle shaft 51 nearest the operating side of the apparatus has rigidly concentrically mounted thereon the cylinder member 81. A piston member 82, slidably concentrically mounted in the cylinder member 81, has mounted thereon a cup member 83 formed of rubber or other impervious elastic material. Cup member 83 has a flexible annular lip 84 adapted to make gas-tight contact with the ware to be mounted on the chuck.

The piston member 82 comprises a cylindrical head 85 which fits closely and slidably in larger bore 86 of cylinder member 81, and a cylindrical boss 87, coaxial with head 85, which fits closely and slidably in a smaller bore 88 of cylinder member 81 coaxial with larger bore 86. Head 85 and boss 87 of piston member 82 are rigidly connected by a shaft 89 of reduced cross section.

A key 90 in shaft 89, slidably fitting in keyway 91 in bore 87 of cylinder member 81, prevents relative rotation of the cylinder member 81 and piston member 82. Piston member 82 is normally urged outwardly of the cylinder member 81 by compression spring 92 located between sleeve 93 pressed into the axial bore 94 of the shaft 51, and stop nut 95 adjustably mounted on threaded rod 96 fixed to the end of boss 87; it is obvious that the force urging the piston member 82 outwardly of the cylinder member 81 may be adjusted by adjusting the position of stop nut 95 on rod 96. The outward travel of the piston member 82 is limited by the snap ring 97 fitting into a groove in the bore 86 of cylinder member and adapted to contact shoulder 98 on piston member 82. The inward travel of the piston member 82 is ultimately limited by contact of the piston member with the cylinder member but is limited in use by contact of the ware 1 carried by cup member 83 with the locating disk 99 rigidly mounted on the free end of cylinder member 81.

Cylindrical boss 87 is provided with a plurality of flutes 100 extending from the space between the shaft 89 and the bore 88 to a point adjacent the other end of the boss. The length of flutes 100 is such that when the piston member 82 is in its outward position as shown in Fig. 20 the ends of the flutes are located within the bore 88 and seal the interior of cylinder member 81 from the bore 94 in shaft 51. When the piston member 82 is in its retracted ware-holding position shown in Fig. 21, the ends of the flutes open into the enlargement 101 of the bore 97 in shaft 51.

In the illustrated embodiment, cylinder member 81 has therein a plurality of release ports 102 extending from the larger bore 86 to the atmosphere; said ports 102 are so located that when the piston member 82 is in its outward position as shown in Fig. 20 the ports 102 are open, and when the piston member 82 is retracted as shown in Fig. 21 the ports 102 are closed by the piston head 85.

In the embodiment shown, moreover, the bolt 103 which holds the cup member 83 to the piston head 85 has a passage 104 therethrough communicating with the bore 86 by means of passages 105 in piston head 85.

Parts of the chuck 80 such as cylinder member 81, piston member 82, cup member 83, and locating disk 99 are concentric with each other and with the axis of rotation of spindle shaft 51, and rotate with spindle shaft 51. The parts are so proportioned that when the piston member 82 is in its extreme outward position as shown in Fig. 20 the annular lip 84 projects a substantial distance beyond the outer face of locating disk 99, and the piston is capable of being moved until the annular lip 84 is flush with or projects only slightly beyond the outer face of locating disk 99 to enable the chuck to hold the ware against the disk 99, as shown in Fig. 21.

Operation of ware-holding means

A sub-atmospheric pressure or partial vacuum is maintained in bore 94 of each spindle shaft 51 by means of flexible tube 53 connected to pipe 52 in which a sub-atmospheric pressure is maintained. When the chuck 80 is not carrying ware, the piston member 82 is in its extreme outward position as shown in Fig. 20; the cylindrical boss 87 closes the bore 88 and thereby seals the bore 94 of shaft 51 from the larger bore 86 of the cylinder member. Obviously, to maintain piston member 82 in the projected position against the snap ring 97, the compression of the spring 92 has been adjusted by means of the nut 95 so that the projecting force exerted by the spring 92 (in pounds) is slightly greater than the retracting effect of the sub-atmospheric pressure (in pounds per square inch) times the cross-sectional area (in square inches) of the boss 87, the ports 102 communicating with bore 86 and bore 88 being open to the atmosphere. When a spindle 50 carrying a chuck 80 is at a loading station ready to receive ware and not rotating, the operator presses the ware to be mounted, shown as plate 1, against the annular lip 84 of cup member 83; sufficient pressure is placed against the plate 1 to push the piston member 82 inwardly against the pressure of spring 92 until the ports 102 are closed and the ends of the flutes 100 open into the enlarged recess 101 in the end of shaft 51. Under these conditions, the ports 102 being closed, the lip 84 on cup member 83 forms a tight seal against the back of the plate 1, closing off the communication, through the passageways 104 and 105, between the atmosphere and the bore 86 while opening said bore 86 to the sub-atmospheric pressure in shaft 51 through the space between shaft 89 and bore 88, flutes 100, and recess 101. Consequently, a sub-atmospheric pressure is maintained in the interior of cylinder member 81 and inside of cup member 83; and the ware is held against the lip 84 by the difference between this sub-atmospheric pressure and atmospheric pressure. Preferably, the operator presses against and moves the ware until it contacts the outer surface of locating disk 99, where it is held by the above mentioned difference in pressures which is large enough to overcome the force exerted by the compression spring 92. Obviously, due to the fact that the cross-sectional area of the piston head 85 is larger than the cross-sectional area of the boss 87, if a sufficiently low pressure is maintained in the bore 94 in shaft 51, the pressure differential can be great enough to overcome the friction of the sliding parts and the pressure of spring 92, so that the operator need press the ware against the lip of the cup member 83 only until the ports 102 are closed and the ends of the flutes 100 open into recess 101, after which the piston will move without further manual pressure until the ware contacts the locating disk 99. Obviously the force holding the plate 1 against the disk 99 is equal to the aforesaid pressure differential times the area circumscribed on the back of the plate by the splayed lip 84 (shown in Fig. 21) but the vacuum in the shaft 51 will not pull the cup 83 away from the plate 1, due to the fact that the area circumscribed by the lips 84 is greater than the cross-sectional area of the piston head 85. The positions of the ports of the chuck 80 when the ware is mounted and bearing against the locating disk 99 is shown in Fig. 21. The chuck 80 carrying the ware, being rigidly mounted on spindle shaft 51, rotates with the shaft during the lining operation.

When it is desired to remove the ware from the chuck 80, the ware is pulled until the seal is broken between the annular lip 84 of cup member 83 and the plate 1 by twisting and canting the plate on the cup 83 or until the piston member 82 uncovers the release ports 102 in the cylinder member 81; in either case the partial vacuum in the interior of cylinder member 81 is broken, so that the ware is released and can be removed. Thereafter the spring 92 will push the piston member 82 back to the position shown in Fig. 20, so that the chuck is again ready to have ware mounted thereon.

Construction and operation of ware-centering means

The illustrated embodiment includes means for centering the ware on each chuck 80 after the ware is mounted on the chuck at a loading station during the loading operation, so that in the subsequent lining operation the line or lines applied to the ware will be concentric with the ware.

The centering means illustrated, as shown in Figs. 1, 3, 4, 5 and 8, comprises a plurality of ware-contacting units 110 mounted on slidable carriage 20, one such unit 110 being positioned beneath each chuck 80. Each unit 110 comprises a housing sleeve 111 fixed to a bracket forming part of carriage 20. In sleeve 111 is slidably mounted a telescopic rod and tube member 112 (comprised of a rod 112a and sleeve 112b) carrying at is upper end a rotatable roller 113 and a stop 114, and at its lower end a compressive spring 115 which yieldably urges the member 112 downward so that normally its stop 114 contacts the top of sleeve 111. The roller 113 may be of metal, rubber, plastic or other suitable material. Roller 113 is so positioned on slidable member 112 that, when the slidable member 112 is located in its downward position with its stop 114 against the sleeve 111 the roller 113 does not contact the ware mounted on the associated chuck 80, and when the slidable member 112 is moved upwardly the roller 113 may contact the edge of ware on the associated chuck 80. As shown in Fig. 8, the length of slidable member 112 may be adjusted, as for ware of different diameters, by adjusting bolt 116. This bolt, which slides in a slot in a bracket fixed to sleeve 111, also prevents rotation of the roller-carrying slidable member 112 relative to the sleeve 111. The unit 110 advantageously is positioned so that as the member 112 slides the axis of roller 113 moves in a plane including the axis of the spindle 50 with which the unit is associated.

At each loading station is means 117 for moving the roller 113 into contact with the ware. The illustrated means comprises a collared push rod 118 slidably mounted on frame member 10 and adapted to be moved upwardly by pressure exerted on foot treadle lever 119.

When the carriage 20 is positioned at either end of its travel, the lower ends of the roller-supporting slidable members 112 of the units 110 on the carriage 20 are aligned with the tops of the push rods 118 at the loading stations. At each loading station, after an operator has mounted the ware on the chuck 80 in the manner described above and rotation of the spindle 20 carrying the chuck has commenced, the operator may center the ware on the chuck so that the axis of the ware is substantially concentric with the axis of rotation of the spindle; this can be accomplished by suitably pressing foot treadle lever 119 to cause the push-rod 118 to force the member 112 upwardly against the pressure of spring 115 until roller 113 on member 112 contacts the rotating ware and moves it as necessary on chuck 80 until the ware is suitably centered.

The operator knows the ware is centered when the oscillation of the front treadle 19 ceases or reaches a minimum; that is, if the plate 1 is eccentric when placed on the chuck 80, then, as the pressure of the operator's foot brings the roller 113 into contact with the rim of the plate 1, the eccentricity of the plate will cause the shaft 118 to reciprocate and the treadle 119 to oscillate. Foot pressure on the treadle slightly in excess of that required to maintain the roller 113 in contact with the rim of the plate 1 will push the eccentric plate toward the center of the chuck 80 until the oscillations cease, if the rim of the ware is perfectly circular, or until the oscillations reach a minimum, if the ware is slightly "out of round," as is often the case. If the ware is "out of round," this centering device insures that the mean center of the ware will coincide with the center of the chuck; in this respect this centering device is preferable to commonly known centering devices which, for example, employ three centering fingers which move radially toward the center of the chuck and which may even accentuate the eccentricity of an "out of round" piece of ware. The operator quickly, almost instinctively, learns to "let up" on the treadle as the ware is centered, so that in production centering becomes almost instantaneous.

A stop collar 118a is carried by the rod 118 to prevent the adjustable member 112 from being pushed upwardly so far that the ware will be dislodged from the chuck in centering operations by an inexperienced operator.

*Construction of applicator means*

The apparatus illustrated in Figs. 1–11, 15–28 comprises two individual lining means at each applicator station; one lining means, indicated generally by reference character 120, is adapted to apply two narrow circular lines of decorative material to the ware by two lining wheels 121 and 122 which contact and are rotated by the ware; the other lining means, indicated generally by reference character 220, is adapted to apply a relatively wide line of decorative material to the ware in predetermined relation to the two narrow lines, by a lining wheel 221 which contacts and is rotated by the ware and moves radially thereto to form a line of suitable width.

Each lining means 120, as shown in Figs. 1, 2, 3, 4, 23, 24 and 25, comprises an upwardly extending supporting member 123 which is supported at its lower end from a beam 15 for pivotal movement about a horizontal axis extending longitudinally of the apparatus. Said beam forms part of and extends longitudinally of frame 10 at the operating side of the apparatus, being supported from front vertical members 11 in suitable spaced relation thereto by suitable brackets. An upwardly extending rod 124, which is adjustably but rigidly supported from member 123, has a transversely extending portion 125 to the end of which is fixed a rod 126 extending generally horizontally and in the direction of the operating face of the apparatus. As shown in Figs. 23, 24 and 25, lining wheels 121 and 122 are respectively freely rotatably mounted on depending brackets 127 and 128 pivotally supported from rod 126; these brackets are adjustably located on rod 126 by collars 129, 130 and 131. Each of collars 129 and 131 carries a member 132 in which is threaded an adjustable bolt 133 which limits the pivotal movement of the adjacent brackets 127 or 128. Each of said brackets 127 and 128 also includes an upwardly extending member 134 to which is connected one end of a tension spring 135, the other end of which is connected to a bolt 136 adjustably mounted in a slot 137 of a bracket 138 fixed to the rod 126; the lining wheels 121 and 122 are thus yieldably urged toward the ware, being limited by bolts 133.

A trough 139, adapted to contain liquid decorative material, is disposed below lining wheels 121 and 122, being adjustably but rigidly supported from bracket 127. The front end of trough 139 is shaped as shown in Fig. 23 to leave unobstructed the portions of the edges of the lining wheels that contact the ware. Said trough 139 contains liquid decorative material, into which dip the lower portions of the edges of the lining wheels 121 and 122. Mounted on the rear edge of trough 139 on upwardly extending pins 140 are two pairs of spring metal members 141 carrying at their ends wiping pads 142, formed of felted fibrous material or the like. The spring members 141 and wiping pads 142 are so arranged that, as shown in Fig. 25, a wiping pad 142 is pressed against each side of each lining wheel near its edge at the point where the edge leaves the decorative material in the trough 139 when the lining wheel is rotated during application of the line to the ware; the wiping pads 142 remove excess decorative material from the lining wheels. A plurality of pins 140 are provided to support such spring members 140, in different positions along the trough 139 for different positions of one or more lining wheels.

As shown in Figs. 3, 4, 5, 16 and 17, each supporting member 123 is pivotally mounted on a base member 143 which is supported on a member 144 fixed to beam 15. Member 143 is adjustable in a horizontal plane with respect to member 144, being rigidly but adjustably held by bolts 145 in slots 146 in member 143. Member 144 is also adjustable lengthwise of the beam 15.

The lining wheels 121 and 122 of lining means 120 at each applicator station are moved to and from a position at which they can contact ware carried by the chuck 80 of a spindle 50 at the applicator station. As shown in Figs. 2, 3, 4, 5, 6 and 7, this is accomplished in the illustrated embodiment by moving each supporting member 123 about its pivoted lower end toward and from the frame of the apparatus, by means of a cam-follower member 147 and cam 148 on rotating primary time shaft 65. Cam-follower member 147 is adjustably but rigidly fixed to supporting member 123, and is held against cam 148 by a tension spring 149 fixed at one end to the supporting member 123 and at the other end to the frame 10 of the apparatus. Cam 148, one of which is shown to a larger scale in Figs. 6 and 7, is rigidly but adjustably mounted on primary time shaft 65 and comprises two relatively adjustable overlapping plates 150 and 151 whereby the length of cam surface 152 may be adjusted.

In the illustrated embodiment, moreover at each applicator station the supporting member 123 and lining wheels 121 and 122 carried thereby are limited in their movement toward the frame 10 of the apparatus by adjustable stop member 153 carried by the frame 10 of the apparatus.

At each applicator station each cam 148 is so mounted on shaft 65 and has its follower-contacting surface so shaped, that as shaft 65 rotates and carriage 20 moves toward an end of its travel, the lining means 120 carrying lining wheels 121 and 122 moves toward the frame 10 of the machine until it reaches a position such that the lining wheels 121 and 122 can contact the ware on a spindle 50 at the applicator station. The follower-contacting surface of each cam 148 is also so shaped that before the carriage 20 starts to move back to the other end of its travel, the lining means 120 moves away from frame 10 and the wheels 121 and 122 are removed from contact with ware on a spindle 50 at the applicator station, and as carriage 20 moves to the other end of its travel, the lining means 120 moves to the extreme outward position shown in Fig. 5, where it remains for an interval before moving toward the frame 10 of the machine as the carriage reaches the end of its travel to a position where its lining wheels 121 and 122 can contact the ware. Thus, during one revolution of shaft 65, and while the carriage 20 moves from a position located midway between the ends of its travel to an end position, dwells at the end position, and moves back to the central position, each lining means 120 at an applicator station moves from the extreme outward position shown in Fig. 5 to its extreme inward position where its wheels 121 and 122 can contact ware at the applicator position and where it dwells, after which it moves back to its extreme outward position. Since the lining wheels 121 and 122 are pivotally supported from rod 126, and since the springs 135 yieldably urge them toward the ware-supporting spindles, each wheel 121 and 122 contacts the ware with a pressure determined by the tension in its spring 135, and is capable of moving independently to compensate for irregularities in the surface of the ware. Contact of the edge of each of wheels 121 and 122 with the ware causes the wheel to rotate; as each wheel 121 and 122 rotates, its edge carries liquid decorative material from the trough 139 to the ware to apply a circular line of decorative material thereto.

Each illustrated lining means 220 is generally similar to the above described lining means 120, differing therefrom primarily in that lining means 220 has only one lining wheel 221 and is provided with means for moving the lining wheel radially of the ware while it is contacting the ware, to form a wide line on the ware. More specifically, as shown in Figs. 1, 2, 3, 4, 5, 26, 27 and 28, lining means 220 comprises a supporting member 223 pivotally supported at its lower end and adjustably supporting at its upper end a rod 224. Rod 224 has a transversely extending portion 225 rigidly supporting a rod 226 extending horizontally and longitudinally of the operating side of the apparatus. Lining wheel 221 is rotatably mounted on a depending bracket 227, adjustably located by collars 229 and 230 on rod 226, and having a projecting member 234 connected by tension spring 235 to adjustable bolt 236 in bracket 238. A trough 239, adapted to contain liquid decorative material, is disposed below lining wheel 221, being adjustably but rigidly connected to bracket 227. Said trough has disposed therein a roller 254 which is pivotally mounted by adjustably counterweighted arm 255 fitted to trough 239, to bear against the edge of lining wheel 221. Said roller 254 dips into liquid decorating material in trough 239 and applies it to the edge of lining wheel 221, which does not dip into the decorative material. Spring metal members 241 carrying wiping pads 242 are supported from the rear of the trough 239 and arranged so that the wiping pads 242 contact both sides of the lining wheel 221 at points adjacent the edge where it leaves the trough 279, to remove excess decorative material from the wheel 221.

As shown in Fig. 3, 4, and 16, each lining means 220 is moved toward and away from the frame of machine 10 by a cam-follower member 247 which is rigidly adjustably fixed to supporting member 223 and contacts a cam 248 mounted on primary time shaft 65, said cam-follower member 247 being held against the cam by a spring 249 fixed at one end to member 223 and at the other end to frame 10 of the apparatus. Each cam 248, like each cam 148, is rigidly but adjustably mounted on primary time shaft 65 and comprises two relatively adjustable overlapping plates whereby the length of the cam surface may be adjusted. Movement of each member 223 and lining wheel 221 carried thereby toward the frame 10 of the apparatus is adjustably limited by the adjustable stop member 253 mounted on the frame 10 of the apparatus. In the illustrated embodiment, all cams 148 and 248 are of the same contour and mounted in the same angular position relative to the shaft, so that all lining means 120 and 220 move in unison toward and from the frame 10, as described above in connection with a lining means 120. Each lining wheel 221 also yieldably contacts and is rotated by the ware to apply decorative material thereto, as described above in connection with lining wheels 121 and 122.

While each lining wheel 221 is in its ware-contacting position, moreover, it is moved substantially axially thereof by an amount sufficient to form on the ware contacted by the wheel a line of decorative material of the desired width. In the illustrated apparatus, as shown in Figs. 3, 4, 5, 16, 18 and 19, each supporting member 223 is pivotally mounted on a base member 243 which is supported on a member 244 slidably mounted on beam 15. Base member 243, similarly to base member 143 of lining means 120, is adjustable in a horizontal plane with respect to member 244. Each slidable member 244 is connected by a bar 256, the length of which is adjustable by a turnbuckle, to a block 257, pivotally mounted on a lever 258.

Lever 258 is pivotally connected at one end to a supporting member 259 adjustably but rigidly mounted on beam 16, and has at the other end thereof a slot 260 in which a slidably disposed crank pin 261 of rotatable crank 262. Each crank 262, of which there is one for each applicator station, is rigidly mounted on one end of a short shaft 263 which is rotatably supported from the frame of the apparatus and which has rigidly mounted on its other end a bevel gear 264 meshing with a bevel gear 265 rigidly mounted on primary time shaft 65. As time shaft 65 rotates, it causes rotation of crank 262, the crank pin 261 of which moves the lever 258 back and forth about its pivot joint as shown in Fig. 18. Such movement of the lever 258 causes the member 244 carrying base member 243 to reciprocate in timed relation to the apparatus, so that the lining wheel 221 supported from the base member 243 reciprocates lengthwise of the apparatus and, when in contact with the ware, moves substantially radially of the ware to form a line of the desired width.

As shown in Figs. 18 and 19 at each applicator station the bar 256 is resiliently connected to the block 257 pivotally mounted on lever 258, by means permitting adjustment of the length of travel of said bar 256. In the illustrated connection, the bar 256 is slidably mounted in and transversally located with respect to member 259, by passing through a hole in lug 266 at the end of member 259 nearest lining means 220, and by having its end bored to fit slidably on the pin 267 on an adjustable stop bolt 268 threaded into lug 269 at the other end of member 259. Bar 256 is also slidably mounted in a hole passing through block 257 pivotally connected to lever 258. Bar 256 is provided with stops 270 and 271 spaced from and on either side of block 257, at least stop 270 being adjustable along the length of the bar 256. Compression springs 272 are mounted around bar 256 on each side of block 257 between said block and stops 270 and 271. Stops 270, 271, and stop bolt 268 are so located that, as the block 257 moves back and forth in a direction extending generally axially of bar 256 due to the above-described movement of lever 258, the bar 256 reciprocates in a path shorter than the path of movement of block 257; movement of bar 256 is limited on one side by contact of the stop 270 with lug 266, and on the other side by contact of the end of bar 256 with stop bolt 268, the springs 272 compressing as necessary. This causes the lining wheel 221 to dwell at each end of its reciprocatory path for a substantial period, so that when it contacts the ware it will form a complete circle at each edge of the relatively wide line formed on the ware. Moreover, by proper adjustment of stop 270, stop bolt 268, and if desired stop 271, it is possible to adjust the length of reciprocatory travel of bar 256, and hence of lining wheel 221, to adjust the width of line formed on the ware between relatively wide limits.

In the lining means 120 and 220 described above, the position of the lining wheels 121 and 122 and lining wheel 221 are so adjusted that they contact the ware at points where substantially pure rolling contact is obtained, which makes possible the formation of perfect circular lines.

It is apparent that in the illustrated apparatus, by proper adjustment of the adjustable parts mentioned, one or more decorative lines may be applied in a wide variety of positions on ware of a wide variety of shapes.

Operation of applicator means

At each applicator station, as ware carried on a chuck 80 of a spindle 50 mounted on the carriage 20 is moved to the applicator station by movement of the carriage, the cams 148 and 248 mounted on the rotating primary time shaft 65, respectively cooperating with the cam follower members 147 and 247 of lining means 120 and 220, cause the lining wheels 121 and 122 of lining means 120, and the lining wheel 221 of lining means 220, to move toward the frame 10 and the ware. The lining wheels contact the rotating ware carried by the rotating spindle 50 at the applicator station, and are rotated thereby and apply decorative material thereto. While the lining wheel 121 contacts the ware, it completes at least one movement from one end of its path of reciprocatory travel to the other, dwelling at each end for a sufficient time to form a complete circle, and this forms a relatively wide line. Before the carriage starts to move back, the cams 148 and 248 cause the lining wheels to break contact with the ware, after which said cams cause the lining means 120 and 220 to move to their extreme positions away from the frame 10 as the carriage 20 moves back toward its original position. As further movement of the carriage brings an adjacent spindle to the same applicator position, the above cycle of operations is repeated.

Construction of drive means

As shown in Figs. 1, 2 and 3, the driving means for the apparatus illustrated comprises a subframe 180, associated with frame 10 at one end thereof, on which is mounted a suitable source of power such as electric motor 181. A speed reducer 182, which may be adjustable to change speed ratios if desired, is also mounted on subframe 181 and is driven from motor 181 by pulley 183 on the shaft of motor 181, pulley 184 on the input drive shaft 185 of the speed reducer 182, and V-belt 186 passing over these pulleys. A vacuum pump 187, which is shown as being of the gear type and which is connected to vacuum pipe 53, is also mounted on the sub-frame 180 and is driven from the input drive shaft 185 of the speed reducer 182 by small pulley 188 on said shaft 185, large pulley 189 on the shaft of pump 187, and V-belt 190 passing over these pulleys. The size of pulleys 188 and 189 are so chosen that they provide the desired speed of rotation of the shaft of pump 187. Motor 181 and pump 187 are shown as being mounted on slidably adjustable bases, to make it possible to adjust the tension in belts 186 and 189. Primary time shaft 65 is positively rotated from the output shaft 191 of the speed reducer 182 by sprocket 192 on said shaft, sprocket 193 on primary time shaft 65, and chain 193 passing over these sprockets. As shown in Figs. 5, 9 and 11, secondary time shaft 40 is positively driven from primary time shaft 65 by sprocket 195 mounted on primary time shaft, sprocket 196 mounted on secondary time shaft 40, and chain 197 passing over said sprockets. In the illustrated embodiment, the sprockets 195 and 196 are so related that the secondary time shaft 40 rotates at one-half the speed of the primary time shaft, to provide the proper time of reciprocation of carriage 20 in relation to the operation of the rest of the apparatus.

*Operation of apparatus as a whole*

During the operation of the apparatus illustrated in Figs. 1–11, 15–28, an operator is stationed at each of the four loading stations A to perform, while a spindle 50 is positioned at the loading station by carriage 20, the steps of removing decorated ware from the chuck 80 of the spindle, and mounting and centering undecorated ware on the chuck 80. During operation of the apparatus, the primary time shaft 65 and the secondary time shaft 40 are each rotated at a constant speed by the means discussed above, the speed of the secondary time shaft being half that of the primary drive shaft; the vacuum pump 187 is operated continuously to maintain constantly a sub-atmospheric pressure in pipe 53 and compressed air is supplied to air pipe 37.

The carriage 20 is moved back and forth, with a dwell of equal length at each end of its travel, on the ways 13 and 14 of frame member 10 in such manner that each of the spindles 50 rotatably mounted on the carriage 20 is moved from a loading station to an applicator station and back to the same loading station, and is positioned at the loading and applicator stations for the same length of time. This time in general is determined by the time required for the operator at a loading station to unload lined ware from a chuck 80 of a spindle 50 at the loading station, and to load unlined ware on such chuck by mounting ware thereon and centering it as described above. As previously described, such operation of the carriage 20 is effected by the compressed air-operated cylinder 30, the movement of the piston of which is controlled by the cams 38 on the secondary time shaft 40, which cams open and close the two valves 35 controlling the flow of air to the ends of cylinder 30.

More specifically, the sequence of operations is as follows, assuming that the carriage has just completed its travel in one direction, and that a spindle 50 which has just arrived at any loading station has mounted on its chuck 80 ware which has been lined at an adjacent applicator station: The spindle 50 is not rotated at the initial portion of the time it is at the loading station since the cam 66, mounted on primary time shaft 65 and actuating the valve 63 controlling the flow of air to the air motor 58 driving the spindle, has the valve 63 closed. During this period when the spindle is stationary, the operator removes the lined ware from the chuck 80 by merely pulling it from the chuck, and mounts on the chuck 80 ware to be lined by merely pressing the ware against the cup member 83 of the chuck and causing the ware to engage the locating disk 99 of the chuck. After cam 66 opens valve 63 and causes air motor 58 to rotate and drive spindle 50 by contact of wheel 59 of motor with wheel 55 of the spindle, the operator centers the ware on the rotating chuck 80 by suitably operating foot treadle lever 119, which causes the roller 113 of the centering means to contact the edge of the ware and, if necessary, move it on the chuck 80 until it is centered. The time which the carriage 20 spends at that end of its travel is sufficient to permit the operator to perform the above operations.

Thereafter, the carriage 20 moves to the other end of its travel and carries the spindle 50 having the centered ware mounted thereon to the adjacent applicator station B, where it is lined as described above by the lining means 120 and 220. While the ware is at the applicator station it is rotated since the spindle 50 on the chuck of which is mounted the ware is driven by constantly operating air motor 56 through contacting wheels 55 of the spindle and 57 of the air motor. The rotating ware is contacted by the lining wheels 121 and 122 of lining means 120, and by lining wheel 221 of lining means 220, said lining wheels being caused to move toward and contact the ware at the proper time by cams 148 mounted on primary time shaft 65 and cam-follower member 147 and spring 149 of lining means 120, and by cam 248 on primary time shaft 65 and cam-follower member 247 and spring 249 of lining means 220. The stop members 153 and 253 properly limit the inward movement of the members 123 and 223 carrying the lining wheels, which because of their resilient pivotal mountings contact the ware with the proper pressure. The lining wheels are rotated by the ware through frictional contact; and during such rotation the edges of the lining wheels apply decorative material to the ware from the troughs 139 and 239. While the lining wheel 121 is in contact with the ware, it is moved substantially radially of the ware, at least in one direction, to form a line of predetermined width, such movement being effected by rotating crank 262 moving pivoted lever 258 which reciprocates the supporting member 223 for the lining wheel 221.

Cams 148 and 248 cause the lining wheels 121 and 122, and 221 to leave the ware before the carriage starts moving again, after which the carriage 20 moves back to the loading station and the cycle is repeated.

In the illustrated embodiment, it is apparent that each spindle 50 mounted on carriage 20 is either at an applicator station or a loading station when the carriage is at an end of its travel; that each loading station always has a spindle 50 thereat when the carriage 20 is in an end position; that each applicator station except the two at the ends of the apparatus always has a spindle thereat when the carriage 20 is in an end position; and that each end applicator station has no spindle thereat when the end spindle is at the adjacent loading stations, so that the end applicator stations are in use half as often as the intermediate stations. It is also apparent that at each loading station, and at each applicator station except the end ones, operations are performed alternately on each of two spindles; at the end applicator stations operations are performed on only one spindle.

At each loading station, the spindle driving air motors 58 are stopped and started simultaneously and at all applicator stations the applicator means 120 and 220 operate and their actuating parts operate simultaneously, although it is apparent that these and other parts may be adjusted to operate independently of or differently from corresponding parts.

Construction and operation of modified lining means

Figs. 12, 13 and 14 illustrate a portion of a modified lining apparatus comprising two lining wheels 321 and 322 adapted to apply two circular lines to rotating ware. The structure of these figures is generally similar to that of Figs. 23, 24 and 25, differing primarily in that each lining wheel is not only pivotally mounted for movement about an axis extending generally longitudinally of the axis of the wheel, but is also mounted for pivotal adjustment about an axis extending substantially at right angles to the axis of the wheel.

More particularly, in the apparatus of Figs. 12, 13 and 14, wheel 321 is rotatably mounted on a bracket 354, and lining wheel 322 is rotatably mounted on a bracket 355. Bracket 354 is rigidly fixed to a pin 356 which is adjustably but rigidly fixed by adjusting bolt 357 in a bracket 327 pivotally mounted on shaft 326, corresponding to shaft 126 of Figs. 22, 23, and 24. Bracket 355 is similarly rigidly fixed to a pin 358 adjustably but rigidly fixed by bolt 359 in bracket 328 pivotally mounted on shaft 326. Brackets 327 and 328 are located on shaft 320 by collars 329, 330 and 331, and are limited in their movement toward the ware by adjustable stop bolts 333 threaded into members 332 fixed to collars 329 and 331. Each of wheels 321 and 322 is yieldably urged toward the ware by tension spring 335 connected to adjustable bolt 336 fixed to a bracket 338, and to member 334 fixed to each of brackets 327 and 328.

Therefore, the wheels 321 and 322 are pivotally supported and actuated as are wheels 121 and 122 of the embodiment of Figs. 22, 23 and 24, and each is also adjustable about an axis extending transversely of the axis of the wheel. Thus the angle each wheel makes with the axis of rotation of the ware may be adjusted, so that the wheel may be adjusted to apply a line to ware of any one of a wide variety of contours; and when two or more wheels which are so adjustable are employed the spacing of the ware-contacting portions of their peripheries may be adjusted, as by causing the wheels to "toe in," to adjust the spacing of lines framed by the wheels within wide limits.

In the embodiment of Figs. 12, 13 and 14, moreover, each of the wheels 321 and 322 dips into a trough 339 containing liquid decorating material, and is provided with wiping pads 342 on opposite sides of the wheel near its edge to remove excess decorating material. The pads 342 for each wheel are carried by two spring arms 341 mounted on a bracket 360 fixed to the bracket 354 or 355 for supporting the wheel. By means of an adjusting nut 361 on bolt 362 fixed to bracket 360, each arm 341 is adjustable to adjust the pressure of its wiper pad 342 against the wheel.

Construction of edge-banding means

Figs. 29 to 36, inclusive, illustrate an applicator means, generally indicated by reference numeral 400, for applying a band of decorative material, such as gold, to the edges of an article such as an article of ceramic ware carried by a spindle 50. Such applicator means may be employed in the apparatus described above, at one or more applicator stations, in place of one or both applicator means 120 and 220.

The illustrated applicator means 400, as particularly shown in Figs. 29 and 30, comprises a stationary upwardly extending supporting member 401 which carries the applicator head 402. Member 401 is rigidly mounted by being clamped at its lower end to beam 15 which extends longitudinaly along the operating side of the apparatus and forms part of frame 10, and by being connected intermediate its ends to the member 153 forming part of the adjustable stop described heretofore. Member 401 is adjustable as to height to permit raising or lowering of head 402 to band ware of different diameters, and carries a horizontally extending bracket 403 to which is adjustably clamped head 402, the position of which can be horizontally adjusted toward and away from chuck 80 to permit head 402 to operate on the edges of articles of different depths.

Head 402 comprises a housing 404 in the front wall of which are journalled upper and lower horizontal shafts 405, 406 for rotation about axes substantially parallel to the axis of rotation of the spindle carrying the ware. Upper shaft 405 is positively rotated by motor 407 through speed-reducing gear box 408 and gears 409 and 410; lower shaft 406 is positively rotated from upper shaft 405 by gear 411 on shaft 405 and gear 412 on shaft 406. Upper shaft 405 has rigidly mounted thereon a cylindrical roller 413 of substantial width, which contacts a cylindrical roller 414 of substantial width rigidly mounted on lower shaft 406; the diameters of rollers 413 and 414 differ slightly from the diameters of the pitch circles of gears 411 and 412, as shown in Fig. 33, so as to provide between the surfaces of the rollers a wiping action which spreads uniformly over the surface of lower roller 412 liquid decorative material applied to the upper roller. Rollers 413 and 414 may be formed of any suitable material, such as metal, hard rubber, plastic, etc.

In the illustrated embodiment, a measured amount of liquid decorative material, such as a gold or gold-forming solution, is deposited on the upper surface of upper roller 413 from dispensing reservoir 415. The illustrated reservoir 415 is a commercially available device comprising a plunger 416 and valve seat 417, which permits gravity feed of liquid from the reservoir 415 through orifice 418 when the needle is lifted; the amount of liquid fed from the reservoir when the plunger is lifted may be adjusted by adjusting nuts 419 and 420. In the illustrated apparatus, the plunger 416 is periodically lifted by the lever 421; one end of lever 421 is pivotally supported from housing 404, and its other end is periodically raised and lowered by push rod 422 slidably mounted at the front of housing 404. Push rod 422 is periodically raised and lowered by suitably shaped cam 423 mounted at the rear end of upper shaft 405.

The illustrated applicator head 402 also comprises two movable banding rollers 424, each of which is substantially cylindrical in shape and of substantial width. The rollers 424 are adapted to be positioned normally in rolling contact with the surface of the lower roller 414 which applies decorative material thereto, and to be moved at the proper times into the proper position for applying a band of decorative material to the edge of the ware to be decorated. To this end, each of the rollers 424 is rotatably mounted on the end of a shaft 425, being located longitudinally of shaft 425 by collars 426. As shown to advantage in Figs. 31, 33 and 34, each shaft 425, at a point intermediate its ends, is pivotally mounted on a stud 427 which is pivotally connected to a collar 428 rigidly but adjustably mounted on a shaft 429; a compression spring 430 is disposed about each stud 427 between the associated shaft 425 and collar 428, to bias the shaft 425 relative to shaft 429 to the position shown in Fig. 35. Each shaft 425 therefore is capable of limited substantially universal movement with respect to shaft 429. Shaft 429 is oscillably mounted on and across the rear of housing 404.

Each shaft 425 has mounted thereon, in a fixed position near the end thereof remote from the roller 424, a rotatable roller 431 which in the illustrated embodiment takes the form of a ball bearing of standard type. The surface of each of rollers 431 bears against surface of an associated cam member 432, being urged against said cam surface by a tension spring 433 connecting the end of shafts 425, as shown in Figs. 33 and 34. As is shown to advantage in Figs. 34 and 36, the two cam members 432 are adjustably inclined from the vertical, being pivotally connected at their lower ends to the rear portion of the housing 404 of the applicator head, and being pivotally connected at their upper ends to arms 434 which are rigidly connected together by a joint 435 which permits the angle between the arms 434 and hence the inclination of the members 432 to be adjusted.

When the shaft 429 is turned for part of a revolution in the proper direction, as shown in Fig. 31 the pivot collar 428, stud 427, and spring 430 and for each shaft 425 cause said shaft to swing downward; meanwhile the roller 431 on each shaft 425 moves upwardly along the surface of the associated inclined cam member 432 and causes the shaft 425 to move toward the other shaft 425. Therefore, the rollers 424 move so that they are inclined downwardly from the horizontal and toward each other, as shown in Figs. 31 and 32, and contact ware carried by the spindle 50. By proper adjustment of the parts of the device illustrated in Figs. 29–36, and particularly by adjustment of the inclination of cam members 432, the rollers 424 can be caused to make substantially true rolling contact with the edge of the ware, this edge usually being the edge of a concave or substantially frusto-conical wall. In other words, each of the rollers 424 may be caused to contact the ware while positioned so that its axis of rotation approximately intersects the axis of rotation of the spindle at a point which is the vertex of the cone, or the center of the sphere, defined by the portion of the ware adjacent the edge being banded. Thus each roller 424 may be positioned to contact the ware with the decorating surface of roller 424 substantially perpendicular to the surface being decorated of the ware.

In the illustrated embodiment, the shaft 429 is periodically oscillated, by crank arm 436 thereon, between the position in which it causes rollers 424 to be in contact with lower roller 414 to the position in which it causes the rollers 424 to contact the ware, and back to the original position. Said crank arm 436 is connected by adjustable-length link 437 to one end of the lever 438 pivotally mounted intermediate its ends at lug 439 on housing 404; the other end of lever 438 is pivotally connected to the upper end of rod 440. The lower end of rod 440 is horizontally slidably disposed in a cooperating guide member 441 on the upper end of a vertical rod 442, to permit horizontal adjustment of the rod 440 when the applicator head 402 is horizontally adjusted. Rod 442 is slidably mounted in bracket 443 on support 401, this slidably supported portion of rod 442 being squared to prevent twisting, and is provided with turnbuckle 444 whereby its length may be adjusted. A lever 445 is pivotally connected at one end to the lower end of rod 442, and at the other end is pivotally mounted on frame 10 of the apparatus A cam-follower roller 449, mounted in bracket 446 rigidly but adjustably mounted on lever 445, contacts the surface of an actuating cam 448. This cam 448 is mounted on primary time shaft 65 which is supported and driven as hereinbefore described. Cam 448, as cams 148 and 248 described hereinabove, may be adjustable both as to position and to length of cam surface.

The applicator rollers 424 are normally urged against lower roller 414, and the cam follower roller 446 is held against cam 448 by tension spring 449 between the lever 438 and the applicator head housing 404.

It is apparent that by adjustment of the inclination of cam members 432 and the length of link 437, as well as by adjustment of other parts indicated as being adjustable, the inclination of the applicator rollers 424 toward the ware and toward each other may be adjusted to provide substantially pure rolling contact of the rollers on ware of a wide variety of sizes and shapes.

*Operation of edge-banding means*

As indicated above, the primary time shaft 65 is constantly rotated, and at predetermined intervals a ware-carrying spindle 50 is moved into each applicator station, held there for a predetermined time while it is rotated and ware carried thereon is decorated, and is then moved away to a loading station for removal of decorated ware from the spindle and for mounting on the spindle of ware to be decorated.

In the apparatus of Figs. 29 to 36, the parts, and particularly the cam 448 are so related and operated, that after the spindle 50 carrying ware I is at the applicator station and is rotating, the cam 448 operating through lever 445, rods 440 and 442, lever 438, and link 437 causes the shaft 429 to turn for a portion of a revolution. Such movement of shaft 429 causes the shafts 425 carried thereby to be downwardly inclined, while contact of the rollers 431 on shafts 425 with their respective cam members 432 causes the shafts 425 to be inclined toward each other, so that the applicator rolls 424 are canted in the proper position to make substantially pure rolling contact with the edge of the ware. While in contact with the ware edge, the rolls 424 apply thereto liquid decorative material from their surfaces, and the substantially pure rolling contact of the rolls make possible the application of a uniform band without imprefections as would be caused by accumulations of decorative material on the ware arising out of scraping action of the rollers on the ware. Before the ware-carrying spindle is moved from the applicator station, the applicator rolls 424 are withdrawn from the ware by operation of the cam 448 and the intermediate mechanism.

Except for the time that the rolls 424 are moved to contact the ware, they remain in contact with the lower roller 414. Both lower roller 414 and upper roller 413 are continuously rotated from motor 407; periodically, small amounts of liquid decorative material are deposited on the top roller by reservoir 415, the valve plunger 416 of which is actuated from cam 423. This decorative material is carried around to lower roll 414 and is uniformly spread on its cylindrical surface by the wiping action caused by the difference in speeds between the surfaces of rollers 413 and 414. A uniform coating of liquid decorative material is applied from lower roll 414 to the surface of each of applicator rolls 424 when the rolls 424 contact lower roll 414.

It is apparent that the amount of decorative material deposited on upper roller 417 may be controlled by adjustment of nuts 419 and 420, and that the applicator means as a whole may be adjusted to edge-band ware of different sizes and shapes by means of the adjustable parts mentioned above It is apparent that in one or more applicator stations of the apparatus hereinbefore described, one or both of the lining means described may be replaced by the edge banding means under discussion, and vice versa, since the apparatus is designed for such replaceability.

The ware which may be decorated by the above described apparatus embodying the invention may be glazed or unglazed ceramic ware which may or may not have been previously partially decorated, and which may or may not require further treatment such as glazing and/or firing after being decorated by apparatus embodying the invention. While the invention has been described above in connection with the decoration of ceramic ware of the shape of dishware, plates, saucers or the like, it is apparent that ceramic articles of other shapes and that articles other than ceramic ware may be decorated by apparatus embodying the invention. The term "ware" in the appended claims is intended to include articles formed of ceramic or other materials of a variety of shapes which may be decorated by apparatus embodying the invention.

The decorative material which may be applied to the ware by apparatus embodying the invention may be any suitable material such as paint, ink or any of the materials ordinarily used or suitable for decorating ceramic ware; such material may or may not require after treatment such as baking or firing subsequent to application to the ware.

It is apparent that the above described embodiments of the invention are purely illustrative and that modifications other than those described above and other embodiments of the invention may be devised, and apparatus embodying the invention may be employed for different purposes than those mentioned above, without departing from the spirit of the invention. Thus in the illustrated apparatus, all of the several lining means 220 can be reciprocated lengthwise of the apparatus to form wide lines on the ware by a single reciprocating means, such as the crank 262 and lever 258, connected to a bar extending longitudinally of the apparatus and connected to the several lining means 220. Furthermore, it is apparent that an apparatus embodying the invention could comprise alternate loading and applicator stations around the periphery of a generally circular frame, and a generally circular carriage carrying spindles moved back and forth between adjacent loading and applicator stations. Different decorative means than those shown may be employed in the applicator stations.

The invention is not limited, therefore, to the specific embodiments disclosed, but is limited only by the scope of the appended claims.

What is claimed is:

1. A longitudinally extending apparatus for decorating ware, having a single operating side at which operators work and ware is decorated, comprising a longitudinally extending frame; a longitudinally extending carriage reciprocably mounted on said frame; a plurality of equally spaced spindles rotatably mounted on said carriage and extending transversely thereof, each of said spindles being adapted to demountably carry ware at an end thereof adjacent the operating side of the apparatus; a plurality of alternate applicator stations and loading stations equally spaced along said frame by the distance between said spindles, means disposed at the operating side of said apparatus for decorating ware carried by a spindle when it is at said applicator station; an air cylinder and piston for reciprocating said carriage in such manner that when the carriage is at one end of its travel, alternate spindles are at said applicator stations and the remaining spindles are at said loading stations where they may be loaded and unloaded with ware, and when the carriage is at the other end of its travel the first mentioned spindles are disposed at said loading stations where they may be unloaded and loaded with ware and the remaining spindles are at said applicator stations, air driven motors positioned along said frame at said loading stations, driving elements on said motor to engage and rotate said spindles when they are at said loading stations, means including a control valve connecting each of said air-driven motors to a source of compressed air; means including a control valve connecting each end of said air cylinder to a source of compressed air; a rotatable shaft extending longitudinally of said frame; cams on said shaft actuating said decorating means at said applicator stations to decorate ware carried by said spindles at said applicator stations; cams on said shaft adapted to control said valves controlling the flow of air to said air-driven motors and to operate each of said air-driven motors for only a part of the time a spindle is engaged with the driving element on said motor; and means operated by said shaft adapted to control said valves controlling the flow of air to said air cylinder to reciprocate said carriage and to cause said carriage to dwell at each end of its travel for a period long enough for said operations to be performed on ware carried by said spindles.

2. A longitudinally extending apparatus for decorating ware, having a single operating side at which operators work and ware is decorated, comprising a longitudinally extending frame; a longitudinally extending carriage reciprocably mounted on said frame; a plurality of equally spaced spindles rotatably mounted on said carriage and extending transversely thereof, each of said spindles being adapted to demountably carry ware at an end thereof adjacent the operating side of the apparatus; a plurality of equally spaced applicator stations disposed along said frame, means disposed at the operating side of said apparatus for decorating ware carried by a spindle when it is at said applicator station; power-driven means for reciprocating said carriage in such manner that when the carriage is at one end of its travel, alternate spindles are at said applicator stations and the remaining spindles are disposed between said applicator stations where they may be unloaded and loaded with ware, and when the carriage is at the other end of its travel the first mentioned spindles are disposed between said applicator stations where they may be unloaded and loaded with ware and the remaining spindles are at said applicator stations, a rotatable shaft extending longitudinally of said frame and carrying a plurality of cams for actuating said decorating means at said applicator stations to decorate ware carried by the spindles at said applicator stations; and means operated from said shaft controlling the power-driven means for reciprocating said carriage and to cause said carriage to dwell at each end of its travel to permit said operations to be performed on ware carried by said spindles.

3. In apparatus of the class described, a reciprocable carriage; a spindle on said carriage adapted to demountably carry ware; an applicator station, means for decorating ware carried by said spindle when said spindle is at said applicator station; means for reciprocating said carriage in such manner that said spindle is first positioned at one end of its travel for a time long enough to permit decorated ware to be removed from and undecorated ware to be mounted on said spindle, then is moved to said applicator station and there positioned for a time long enough to permit ware carried by said spindle to be decorated by said decorating means, and then is moved back to its original position to repeat the cycle; and means for actuating said decorating means to cause it to decorate ware carried by said spindle when it is at said applicator station.

4. In apparatus of the class described, a frame; a reciprocable carriage mounted on said frame; a spindle on said carriage adapted to demountably carry ware; a loading station associated with said frame at which an operator may mount ware on and remove ware from said spindle; an applicator station associated with said frame and spaced from said loading station, at means for decorating ware carried by said spindle when said spindle is at said applicator station; means for reciprocating said carriage in such manner that said spindle is first positioned at said loading station for a time long enough to permit decorated ware to be removed therefrom and undecorated ware to be mounted thereon, then is moved to said applicator station and there positioned for a time long enough to permit ware carried by said spindle to be decorated by said decorating means, and then is moved back to said loading station to repeat the cycle; means for actuating said decorating means to cause it to decorate ware carried by said spindle when it is at said applicator station; means for rotating said spindle while it is at said applicator station; means for rotating said spindle while it is at said loading station, said means operating so that said spindle is stationary during an initial portion of the time and is rotated during the latter portion of the time it is at said loading station; and means for centering the ware on said spindle while it is rotating at said loading station.

5. In apparatus of the class described, a reciprocable carriage; two spaced spindles on said carriage, each adapted to demountably carry ware; an applicator station, means for decorating ware carried by a spindle when said spindle is at said applicator station; means for reciprocating said carriage in such manner that each of said spindles is alternately disposed at said applicator station for a period long enough to permit ware carried by such spindle to be decorated by said decorating means; and means for actuating said decorating means to cause it to decorate ware carried by a spindle when it is at said applicator station.

6. In apparatus of the class described, a reciprocable carriage; two spaced spindles on said carriage, each adapted to demountably carry ware; an applicator station, means for decorating ware carried by a spindle when said spindle is at said applicator station; two loading stations, one disposed at each side of said applicator station, at each of which loading stations an operator may remove ware from and mount ware on a spindle; means for reciprocating said carriage in such manner that each spindle is alternately disposed at said applicator station and at one of said loading stations, one of said spindles being at a loading station when the other of said spindles is at said applicator station, said carriage operating means causing the carriage to dwell at each end of its travel a sufficient time to permit the spindle at the loading station to have decorated ware removed therefrom and undecorated ware mounted thereon and to permit the ware carried by the spindle at the applicator station to be decorated; and means for actuating said decorating means to cause it to decorate ware carried by a spindle when it is at said applicator station.

7. In apparatus of the class described, a frame; a reciprocable carriage on said frame; a plurality of equally spaced spindles on said carriage, comprising two groups of alternately disposed spindles, each of said spindles being adapted to demountably carry ware; a plurality of equally spaced applicator stations disposed along said frame, means for decorating ware carried by a spindle when it is at said applicator stations; means for reciprocating said carriage in such manner that when the carriage is at one end of its travel the spindles of the first group are at the applicator stations and the spindles of the second group are disposed between the applicator stations where they may be unloaded and loaded with ware, and when the carriage is at the other end of its travel the spindles of the second group are at the applicator stations and the spindles of the first group are disposed between said applicator stations where they may be unloaded and loaded with ware, said carriage being by said carriage reciprocating means caused to dwell at each end of its travel for a period long enough to permit the spindles at the applicator stations to be decorated and to permit the spindles between the applicator stations to be unloaded and loaded with ware; and means for actuating said decorating means at each applicator station to cause it to decorate ware carried by a spindle when it is at said applicator station.

8. The machine of claim 7 in which said applicator stations are spaced apart by twice the distance between said spindles.

9. Apparatus for decorating ware comprising a frame; a carriage movably mounted on said frame; a rotatable spindle on said carriage adapted to carry ware; means associated with said frame for decorating ware carried by said spindle; power driven means for moving said carriage in such manner that said spindle is moved to a decorating position adjacent said decorating means where ware carried by said spindle can be decorated by said decorating means, held there for a time sufficient to permit ware carried by said spindle to be decorated, and moved away from said decorating position; and means for bringing said decorating means into contact with ware to actuate said decorating means to decorate ware carried by said spindle when said spindle is in said decorating position, and means for controlling the operation of said power driven means.

10. Apparatus for decorating ware comprising a frame; a carriage reciprocably mounted on said frame; a plurality of spaced rotatable spindles on said carriage each adapted to carry ware; a plurality of means, spaced along and associated with said frame, for decorating ware carried by said spindles; power-driven means for moving said carriage in such manner that each of said spindles is moved to a decorating position adjacent one of said decorating means where ware carried by said spindle can be decorated by said decorating means, held there for a time sufficient to permit ware carried by said spindle to be decorated, and moved away from said decorating position; and means for bringing said decorating means into contact with ware to actuate each of said decorating means to decorate ware carried by said spindles when they are in decorating position, and means for controlling the operation of said power-driven means.

11. In a machine of the class described, a frame; a reciprocable carriage mounted on said frame; a spindle on said carriage adapted to demountably carry ware; a loading station associated with said frame at which an operator may mount ware on and remove ware from said spindle; an applicator station associated with said frame and spaced from said loading station, means for decorating ware carried by said spindle when said spindle is at said applicator station; means for reciprocating said carriage in such manner that said spindle is first positioned at said loading station for a time long enough to permit decorated ware to be removed therefrom and undecorated ware to be mounted thereon, then is moved to said applicator station and there positioned for a time long enough to permit ware carried by said spindle to be decorated by said decorating means, and then is moved back to said loading station to repeat the cycle; means for actuating said decorating means to cause it to decorate ware carried by said spindle when it is at said applicator station; a rotatable element mounted on said frame at said loading station and adapted to be engaged by and rotate said spindle when it is at said loading station; and a rotatable element mounted on said frame at said applicator station and adapted to be engaged by and rotate said spindle when it is at said applicator station.

12. In a machine of the class described, a frame; a reciprocable carriage mounted on said frame; a spindle on said carriage adapted to demountably carry ware; a loading station associated with said frame at which an operator may mount ware on and remove ware from said spindle; an applicator station associated with said frame and spaced from said loading station, means for decorating ware carried by said spindle when said spindle is at said applicator station; means for reciprocating said carriage in such manner that said spindle is first positioned at said loading station for a time long enough to permit decorated ware to be removed therefrom and undecorated ware to be mounted thereon, then is moved to said applicator station and there positioned for a time long enough to permit ware carried by said spindle to be decorated by said decorating means, and then is moved back to said loading station to repeat the cycle; means for actuating said decorating means to cause it to decorate ware carried by said spindle when it is at said applicator station; a wheel rigidly concentrically fixed to said spindle; a rotatable power-driven wheel positioned on said frame at said loading station and adapted to be engaged by and rotate said wheel on said spindle when said spindle is at said loading station; and a rotatable power-driven wheel positioned on said frame at said applicator station and adapted to be engaged by and rotate said wheel on said spindle when said spindle is at said applicator station.

13. In a machine of the class described, a frame; a reciprocable carriage mounted on said frame; a spindle on said carriage adapted to demountably carry ware; a loading station associated with said frame at which an operator may mount ware on and remove ware from said spindle; an applicator station associated with said frame and spaced from said loading station, means for decorating ware carried by said spindle when said spindle is at said applicator station; means for reciprocating said carriage in such manner that said spindle is first positioned at said loading station for a time long enough to permit decorated ware to be removed therefrom and undecorated ware to be mounted thereon, then is moved to said applicator station and there positioned for a time long enough to permit ware carried by said spindle to be decorated by said decorating means, and then is moved back to said loading station to repeat the cycle; means for actuating said decorating means to cause it to decorate ware carried by said spindle when it is at said applicator station; a wheel rigidly concentrally fixed to said spindle; a motor positioned on said frame at said loading station and having on its drive shaft a drive wheel which is adapted to be engaged by and rotate said wheel on said spindle when said spindle is at said loading station; a motor positioned on said frame at said applicator station, a drive wheel driven by said motor to engage and rotate said wheel on said spindle when said spindle is at said applicator station; a source of power, each of said motors being connected thereto; and means, operating in timed relation to said means for actuating said decorating means, for controlling the supply of power to said motor at said loading station so that said motor does not operate during an initial portion of the time but is operated during the latter portion of the time said spindle is at said loading station.

14. In a machine for applying generally circular lines of decoration to ware, a frame; a reciprocable carriage on said frame; a rotatable spindle on said carriage; means to shift said carriage intermittently to hold said spindle periodically at a loading station and at a decorating station; decorating means at the decorating station comprising a lining wheel normally spaced, axially of said spindle, away from ware carried by said spindle, means for adjustably and resiliently supporting said lining wheel so that, when the rim thereof is brought against ware carried by the spindle, the wheel's radius at the point of contact with the ware will be substantially normal thereto, means for moving said support axially toward and away from said spindle and said wheel into and out of contact with ware on said spindle, and means for supplying liquid decorating material to the rim of said wheel and wiping such material from the sides of said wheel; means rotating said spindle at said decorating station; means adapted to rotate said spindle at the loading and unloading station; a centering device at said loading and unloading station; a vacuum chuck on said spindle permitting ware to be loaded, centered, and unloaded on said spindle when at said loading station, said chuck comprising a cylinder mounted coaxially on said spindle, a hollow piston movable axially in said cylinder, a flexible vacuum cup carried by the axially outward end of said piston and opening into said hollow piston, a face plate carried by said cylinder adjacent said vacuum cup, the plane of said face plate being perpendicular to the axis of said cylinder, and inward of said vacuum cup when said piston is in its axially outer position, said cylinder and piston having a passage connected to a source of vacuum and opening into the interior of said hollow piston through a port therein when said piston is in its axially inward position and said passage being closed when said piston is in its axially outward position, whereby ware, when pressed against said vacuum cup until the ware engages the face plate, will be held against said face plate by vacuum but, when ware, held against the face plate by vacuum, is pulled away from the face plate, the piston will be carried axially outward with the ware until said port is closed and said ware is released from the vacuum cup; a source of power for the means for shifting said carriage, a source of power for the spindle rotating means at the lining station, and control means controlling the operation of the machine in the following cycle: power is supplied to the carriage shifting means to shift the spindle to the loading station said spindle remaining at said station while lined ware is removed from said chuck and unlined ware is placed thereon and while unlined ware is centered on said chuck by said centering device, power being supplied to said spindle rotating means at said loading station by operation of said control means during the latter part of the period said spindle is at said loading station, and then power is applied to said carriage shifting means to shift said spindle to said decorating station, said spindle remaining at said station while said control means first operates said decorating means to bring said wheel into contact with ware carried by said spindle and applying decorating material to the ware as said spindle is rotated by the spindle rotating means at the decorating station and then said control means operates said decorating means to move said wheel out of contact with the ware.

15. In an apparatus for applying a circular line of decorative material to ware, a spindle adapted to carry and rotate ware; a supporting member; a rotatable lining wheel pivotally mounted on said supporting member; means on said supporting member yieldably urging said lining wheel toward the ware-carrying portion of said spindle; means for applying decorative material to the edge of said lining wheel; and means for moving said supporting member to bring the lining wheel into contact with ware carried by said spindle, whereby said lining wheel may pivot with respect to said supporting member while in contact with said ware and said wheel, but not said support, is moved by irregularities in the ware during such contact.

16. In an apparatus for applying a circular line of decorative material to ware, a frame; a spindle carried by said frame and adapted to carry and rotate ware; an upwardly extending supporting member which is pivotally supported at its lower portion from said frame; a rotatable lining wheel pivotally mounted on and depending from the upper portion of said supporting member; means on said supporting member yieldably urging said lining wheel toward the ware-carrying portion of said spindle; and means for moving said supporting member about its pivotal support to bring the lining wheel into contact with ware carried by said spindle, said means comprising a power-rotated cam supported from said frame and a cam follower member supported by said pivotally mounted supporting member and contacting said cam.

17. In an apparatus for applying a circular line of decorative material to ware, a spindle adapted to carry and rotate ware; two rotatable lining wheels supported to contact with their edges the surface of the ware while it is rotating to apply decorative material to the ware; and means adjustably supporting said lining wheels so that the angle each makes with the axis of rotation of the ware and with the other linging wheel may be adjusted.

18. Ware decorating apparatus as defined in claim 14, means for shifting said wheel of said decorating means radially of the ware while said wheel is in contact with said ware, said wheel being shifted at a rate less than the width of the rim of the wheel per revolution of the spindle in order to apply a solid band of decoration wider than the rim of the wheel, and a second decorating means as recited in claim 14, said first and second decorating means being spaced, radially of the ware, so that the wheels of the first and second decorating means contact different areas of the ware.

19. In an apparatus for applying a circular line of decorative material to ware, a frame; a carriage movably mounted on said frame; a rotatable spindle on said carriage adapted to demountably carry ware; means for moving said carriage to cause said spindle to move into a position along said frame where ware carried by the spindle may be lined, remain there for a period sufficient to permit ware carried by said spindle to be lined, and move out of said position; means for rotating said spindle while it is in said lining position; means for applying a circular line to ware carried by said spindle when it is in said position, comprising a pivotally supported longitudinal supporting member, a freely rotatable lining wheel yieldably mounted on said supporting member, and means for applying decorative material to the edge of said lining wheel; and means, operating in timed relation with the means for moving the carriage, for moving said supporting member about its pivotal support toward and away from the frame of the apparatus, to bring said lining wheel into contact with ware carried by said spindle when it is at the lining position and to remove said lining wheel from contact with the ware carried by said spindle before said spindle begins to move from said lining position, said means comprising a power-rotated cam rotatably supported from said frame and a cam-follower member supported by said pivotally mounted supporting member and contacting said cam.

20. The apparatus of claim 19, which includes means for moving said supporting member carrying said lining wheel in the direction of movement of said carriage while said spindle is at said lining position, to cause said lining wheel to move transversely of ware carried by said spindle and apply to the ware a line wider than the width of the edge of said lining wheel, said means operating in timed relation to the means for moving said carriage and means for moving the lining wheel supporting member toward and away from said frame of the apparatus.

21. In an apparatus for applying decorative material to ware, a rotatable spindle adapted to carry and rotate ware; two rotatable applicator rollers adapted to contact the edge of ware carried by said spindle and apply decorative material thereto; means supporting said rollers for movement from a position where the axis of both rollers are substantially parallel to each other and to the axis of rotation of said spindle to a position in which the axis of said rollers are inclined toward each other and to the axis of rotation of said ware and said rollers contact the edge of said ware and means for so moving said rollers, whereby substantially pure rolling contact between each of said rollers and the edge of said ware is provided.

22. A device for applying decorative material to ware comprising a roll journalled for rotation about a fixed axis; means for applying decorative material to the curved surface of said roll; two rotatable applicator rollers; means for supporting said applicator rollers for movement from a position where the curved surface of said applicator rollers contact the curved surfaces of said roll to a position in which said applicator rollers are inclined to said roll and to each other and means for so moving said rollers.

23. A vacuum chuck for holding ware comprising a rotatably mounted cylinder member having an unsupported end at which ware is carried and having therein a longitudinally extending concentric bore communicating with a recess which is located at a point remote from the unsupported end of said cylinder member and which is adapted to have a subatmospheric pressure maintained therein; and a piston member closely slidably fitting in said bore in said cylinder member and having at the end thereof adjacent the unsupported end of said cylinder member a suction cup member adapted to support ware, said piston member and said cylinder member cooperating to provide between said recess and the interior of said suction cup member a passage which is open when said piston member is disposed inwardly of said cylinder member in ware-carrying position but which is closed by said piston member when said piston member is disposed outwardly of said cylinder in a position in which it does not carry ware, and said cylinder member having a passage connecting the interior of said cylinder member and the atmosphere which is closed by said piston member when it is disposed inwardly of said cylinder member in ware-carrying position but which is open when said piston is disposed outwardly of said cylinder member in a position in which it does not carry ware.

24. A vacuum chuck for holding ware to be decorated comprising a rotatably mounted cylinder member having an unsupported end at which ware is carried and having therein a longitudinally extending concentric bore communicating with a recess which is adapted to have a subatmospheric pressure maintained therein; a piston member slidably mounted in said cylinder member and having at the end thereof adjacent the unsupported end of said cylinder member a suction cup member adapted to support ware, and comprising a longitudinally extending member closely slidably fitting in said concentric bore of said cylinder member, said cylinder member and piston member defining a passage therein whereby when said piston member is disposed inwardly of said cylinder member in ware-carrying position said recess in which a subatmospheric pressure is maintained communicates with the interior of said suction cup member and when said piston member is disposed outwardly of said cylinder member in a position in which it does not carry ware said longitudinally extending member of said piston closes off said recess from the interior of said suction cup; and means for urging said piston member outwardly of said cylinder member.

25. A vacuum chuck for holding ware to be decorated comprising a rotatably mounted cylinder member having an unsupported end at which ware is carried and having therein an enlarged concentric bore and a smaller concentric bore which extends from said enlarged bore away from the unsupported end of said cylinder member and communicates with a recess in which a subatmospheric pressure is maintained; a piston member having at the end thereof a suction cup member adapted to carry ware and comprising an enlarged head which closely slidably fits in said enlarged bore and a longitudinally extending member which closely slidably fits in said smaller concentric bore of said cylinder member, said longitudinally extending member having therein a passage communicating with the enlarged bore of said cylinder member and terminating at a point on the surface of said longitudinally extending member such that when said piston member is moved inwardly of said cylinder member in ware-carrying position said passage opens into said recess in which a subatmospheric pressure is maintained, and when said piston member is moved outwardly of said cylinder member in a position in which it does not carry ware said passage is closed by the wall of said longitudinally extending bore; and means for urging said piston member outwardly of said cylinder member.

26. In apparatus of the class described, a spindle and a ware-carrying chuck comprising a cylinder mounted coaxially on said spindle, a hollow piston movable axially in said cylinder, a flexible vacuum cup carried by the axially outward end of said piston and opening into said hollow piston, and a face plate carried by said cylinder adjacent said vacuum cup, the plane of said face plate being perpendicular to the axis of said cylinder, and inward of said vacuum cup when said piston is in its axially outer position, said cylinder and piston having a passage connected to a source of vacuum and opening into the interior of said hollow piston through a port therein when said piston is in its axially inward position and said passage being closed when said piston is in its axially outward position, whereby ware, when pressed against said vacuum cup until the ware engages the face plate, will be held against said face plate by vacuum but, when ware, held against the face plate by vacuum, is pulled away from the face plate, the piston will be carried axially outward with the ware until said port is closed and said ware is released from the vacuum cup.

HOWARD V. SCHWEITZER.

REFERENCES CITED

The following references are of record in the file of this patent:

UNITED STATES PATENTS

| Number | Name | Date |
| --- | --- | --- |
| 1,600,119 | Macklin | Sept. 14, 1926 |
| 1,718,047 | Hunker | June 18, 1929 |
| 1,840,466 | Quigley | Jan. 12, 1932 |
| 2,045,881 | Strider | June 30, 1936 |
| 2,062,425 | Peters | Dec. 1, 1936 |
| 2,203,572 | Johnson | June 4, 1940 |